US011320671B2

(12) United States Patent
Hatanaka et al.

(10) Patent No.: US 11,320,671 B2
(45) Date of Patent: May 3, 2022

(54) METHOD FOR DESIGNING SPECTACLE LENSES, LENSES AND DEVICES FOR DESIGNING THE SAME

(71) Applicant: HOYA LENS THAILAND LTD., Pathumthani (TH)

(72) Inventors: Takashi Hatanaka, Tokyo (JP); Misaki Hatsuda, Tokyo (JP); Naoya Hirono, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 222 days.

(21) Appl. No.: 16/459,219

(22) Filed: Jul. 1, 2019

(65) Prior Publication Data

US 2019/0324291 A1 Oct. 24, 2019

Related U.S. Application Data

(63) Continuation of application No. PCT/JP2017/047420, filed on Dec. 26, 2017.

(30) Foreign Application Priority Data

Dec. 30, 2016 (EP) .................................... 16207533

(51) Int. Cl.
 *G02C 7/02* (2006.01)
 *G02C 13/00* (2006.01)
(52) U.S. Cl.
 CPC ............. *G02C 7/028* (2013.01); *G02C 7/027* (2013.01); *G02C 13/005* (2013.01)

(58) Field of Classification Search
 CPC .......... G02C 7/027; G02C 7/028; G02C 7/06; G02C 7/061; G02C 7/065; G02B 13/005
 USPC .......................... 351/159.41, 159.42, 159.74
 See application file for complete search history.

(56) References Cited

U.S. PATENT DOCUMENTS

| 6,193,370 | B1 | 2/2001 | Shirayanagi | |
| 2010/0141893 | A1* | 6/2010 | Altheimer | G02C 7/14 351/159.58 |
| 2010/0296055 | A1 | 11/2010 | Esser et al. | |
| 2010/0309428 | A1* | 12/2010 | Altheimer | G02C 7/061 351/159.42 |
| 2011/0157549 | A1* | 6/2011 | Wada | A61B 3/024 351/204 |

(Continued)

OTHER PUBLICATIONS

May 4, 2018 International Search Report issued in International Patent Application No. PCT/JP2017/047420.
(Continued)

*Primary Examiner* — Jordan M Schwartz
(74) *Attorney, Agent, or Firm* — Oliff PLC

(57) ABSTRACT

A method for designing, by means of a computer, at least one surface of a lens for a user. The method includes the steps of (i) obtaining displacement information on an amount of displacement between a user specific fitting position and a reference position, the reference position representing a primary fitting point of a lens surface on a reference line of sight of an eye of the user, and the user specific fitting position representing a user specific fitting point of the lens surface determined on the basis of the user; and (ii) causing calculating a design of the at least one surface of the lens on the basis of said displacement information.

8 Claims, 31 Drawing Sheets

(56) References Cited

U.S. PATENT DOCUMENTS

| | | | | |
|---|---|---|---|---|
| 2011/0211159 A1* | 9/2011 | Suzuki | ............ | G02C 7/061 |
| | | | | 351/159.41 |
| 2012/0002161 A1* | 1/2012 | Altheimer | ............ | G02C 7/061 |
| | | | | 351/159.76 |
| 2015/0293381 A1 | 10/2015 | Mizuno et al. | | |

OTHER PUBLICATIONS

May 4, 2018 Written Opinion of the International Searching Authority issued in International Patent Application No. PCT/JP2017/047420.

* cited by examiner

Fig. 12

| Case | Lens type | R/L | Prescription Sph | Cyl | Ax | Add | Layout PD | FPHT | Worn conditions (frame based) WPA | FCD | FFFA | Mounting adjustment dFPH informed to lens manufacture | dFPH adjustment at mounting | Power at each reference point Far Sph | Cyl | Ax | Near Sph | Cyl | Ax | ADD |
|---|---|---|---|---|---|---|---|---|---|---|---|---|---|---|---|---|---|---|---|---|
| 1-1 | common use PAL | R | +5.00 | | | 2.00 | 32.0 | +4.0 | 8.0 | 11.0 | 0.0 | No | 0.0 | 5.00 | 0.00 | 0 | 7.07 | -0.14 | 102 | 2.00 |
| 1-1 | | L | +5.00 | | | 2.00 | 32.0 | +4.0 | 8.0 | | | No | 0.0 | 5.00 | 0.00 | 0 | 7.07 | -0.14 | 78 | 2.00 |
| 1-2 | common use PAL | R | +5.00 | | | 2.00 | 32.0 | +4.0 | 8.0 | 11.0 | 0.0 | No | -3.0 | 4.98 | -0.09 | 6 | 7.92 | -0.66 | 97 | 2.66 |
| 1-2 | | L | +5.00 | | | 2.00 | 32.0 | +4.0 | 8.0 | | | No | -3.0 | 4.98 | -0.09 | 173 | 7.92 | -0.66 | 82 | 2.66 |
| 1-3 | common use PAL | R | +5.00 | | | 2.00 | 32.0 | +1.0 | 8.0 | 11.0 | 0.0 | -3.0 | -3.0 | 5.00 | 0.00 | 0 | 7.10 | -0.20 | 101 | 2.00 |
| 1-3 | | L | +5.00 | | | 2.00 | 32.0 | +1.0 | 8.0 | | | -3.0 | -3.0 | 5.00 | 0.00 | 0 | 7.10 | -0.20 | 79 | 2.00 |
| 1-4 | common use PAL | R | -5.00 | | | 2.00 | 32.0 | +4.0 | 8.0 | 11.0 | 0.0 | No | 0.0 | -5.00 | 0.00 | 0 | -2.97 | -0.06 | 102 | 2.00 |
| 1-4 | | L | -5.00 | | | 2.00 | 32.0 | +4.0 | 8.0 | | | No | 0.0 | -5.00 | 0.00 | 0 | -2.97 | -0.06 | 78 | 2.00 |
| 1-5 | common use PAL | R | -5.00 | | | 2.00 | 32.0 | +4.0 | 8.0 | 11.0 | 0.0 | No | -3.0 | -4.90 | -0.09 | 94 | -3.03 | -0.07 | 4 | 1.88 |
| 1-5 | | L | -5.00 | | | 2.00 | 32.0 | +4.0 | 8.0 | | | No | -3.0 | -4.90 | -0.09 | 85 | -3.03 | -0.07 | 175 | 1.88 |
| 1-6 | common use PAL | R | -5.00 | | | 2.00 | 32.0 | +1.0 | 8.0 | 11.0 | 0.0 | -3.0 | -3.0 | -5.00 | 0.00 | 0 | -2.99 | -0.03 | 139 | 2.00 |
| 1-6 | | L | -5.00 | | | 2.00 | 32.0 | +1.0 | 8.0 | | | -3.0 | -3.0 | -5.00 | 0.00 | 0 | -2.99 | -0.03 | 41 | 2.00 |
| 2-1 | Indoor use PAL | R | +3.00 | | | 2.50 | 32.0 | +3.0 | 10.0 | 12.5 | 0.0 | No | 0.0 | 2.96 | -0.13 | 94 | 5.48 | -0.17 | 93 | 2.50 |
| 2-1 | | L | +3.00 | | | 2.50 | 32.0 | +3.0 | 10.0 | | | No | 0.0 | 2.96 | -0.13 | 86 | 5.48 | -0.17 | 87 | 2.50 |
| 2-2 | Indoor use PAL | R | +3.00 | | | 2.50 | 32.0 | +3.0 | 10.0 | 12.5 | 0.0 | No | +5.0 | 3.28 | -0.41 | 92 | 5.71 | -0.25 | 90 | 2.51 |
| 2-2 | | L | +3.00 | | | 2.50 | 32.0 | +3.0 | 10.0 | | | No | +5.0 | 3.28 | -0.41 | 87 | 5.71 | -0.25 | 89 | 2.51 |
| 2-3 | Indoor use PAL | R | +3.00 | | | 2.50 | 32.0 | +8.0 | 10.0 | 12.5 | 0.0 | +5.0 | +5.0 | 2.99 | -0.16 | 95 | 5.46 | -0.10 | 99 | 2.50 |
| 2-3 | | L | +3.00 | | | 2.50 | 32.0 | +8.0 | 10.0 | | | +5.0 | +5.0 | 2.99 | -0.16 | 85 | 5.46 | -0.10 | 81 | 2.50 |
| 3-1 | SV (for reading) | R | +4.00 | | | | 32.0 | +2.0 | 11.0 | 13.0 | 0.0 | No | 0.0 | 4.00 | 0.00 | 0 | - | - | - | - |
| 3-1 | | L | +4.00 | | | | 32.0 | +2.0 | 11.0 | | | No | 0.0 | 4.00 | 0.00 | 0 | - | - | - | - |
| 3-2 | SV (for reading) | R | +4.00 | | | | 32.0 | +2.0 | 11.0 | 13.0 | 0.0 | No | -6.0 | 3.94 | -0.15 | 4 | - | - | - | - |
| 3-2 | | L | +4.00 | | | | 32.0 | +2.0 | 11.0 | | | No | -6.0 | 3.94 | -0.15 | 175 | - | - | - | - |
| 3-3 | SV (for reading) | R | +4.00 | | | | 32.0 | -4.0 | 6.0 | 13.0 | 0.0 | -6.0 | -6.0 | 4.00 | 0.00 | 0 | - | - | - | - |
| 3-3 | | L | +4.00 | | | | 32.0 | -4.0 | 6.0 | | | -6.0 | -6.0 | 4.00 | 0.00 | 0 | - | - | - | - |
| 3-4 | SV (for driving) | R | -6.00 | | | | 32.0 | 0.0 | 6.0 | 13.0 | 0.0 | No | 0.0 | -6.00 | 0.00 | 0 | - | - | - | - |
| 3-4 | | L | -6.00 | | | | 32.0 | 0.0 | 6.0 | | | No | 0.0 | -6.00 | 0.00 | 0 | - | - | - | - |
| 3-5 | SV (for driving) | R | -6.00 | | | | 32.0 | 0.0 | 6.0 | 13.0 | 0.0 | No | +3.0 | -6.03 | -0.12 | 3 | - | - | - | - |
| 3-5 | | L | -6.00 | | | | 32.0 | 0.0 | 6.0 | | | No | +3.0 | -6.03 | -0.12 | 176 | - | - | - | - |
| 3-6 | SV (for driving) | R | -6.00 | | | | 32.0 | +3.0 | 6.0 | 13.0 | 0.0 | +3.0 | +3.0 | -6.00 | 0.00 | 0 | - | - | - | - |
| 3-6 | | L | -6.00 | | | | 32.0 | +3.0 | 6.0 | | | +3.0 | +3.0 | -6.00 | 0.00 | 0 | - | - | - | - |

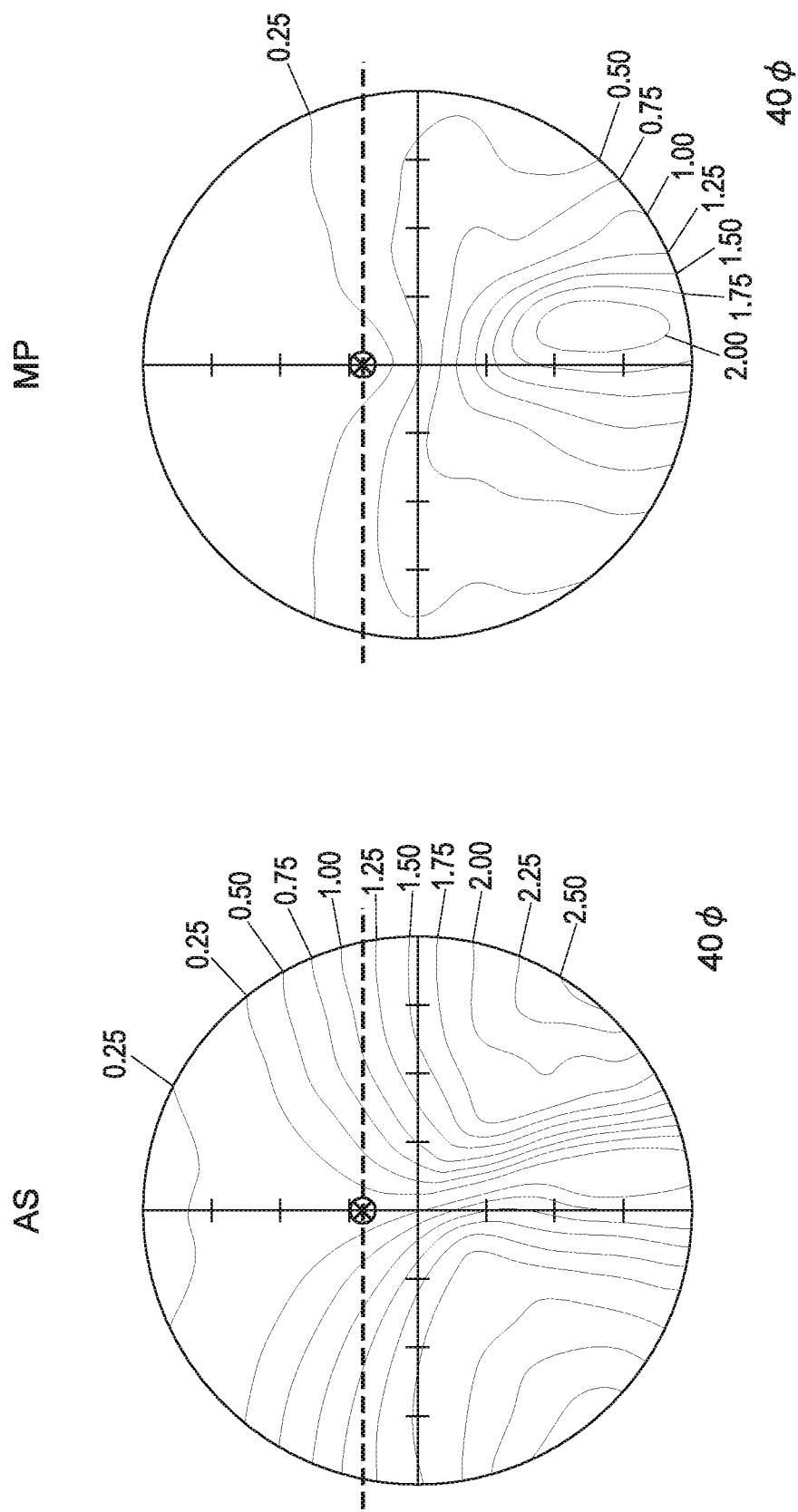

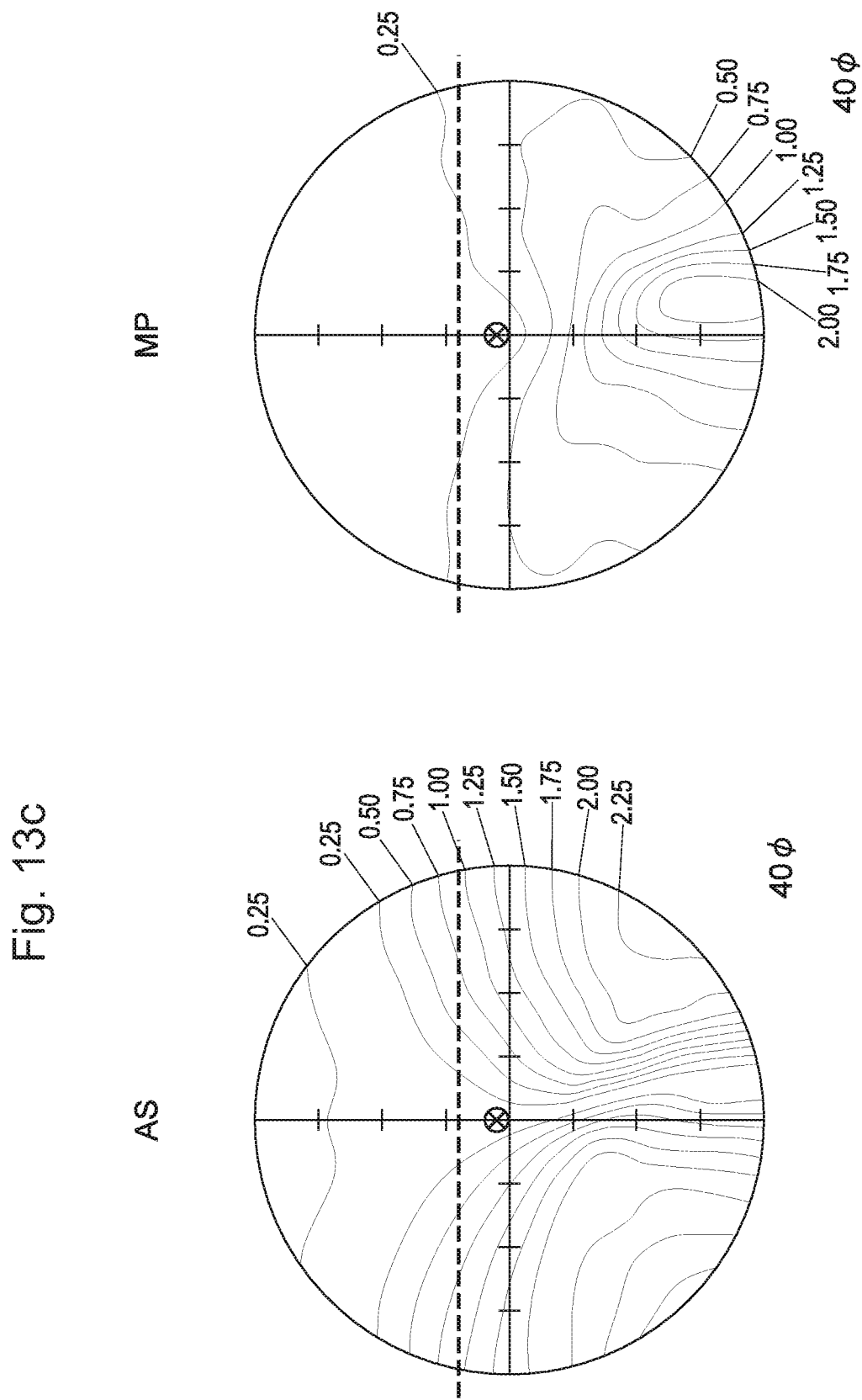

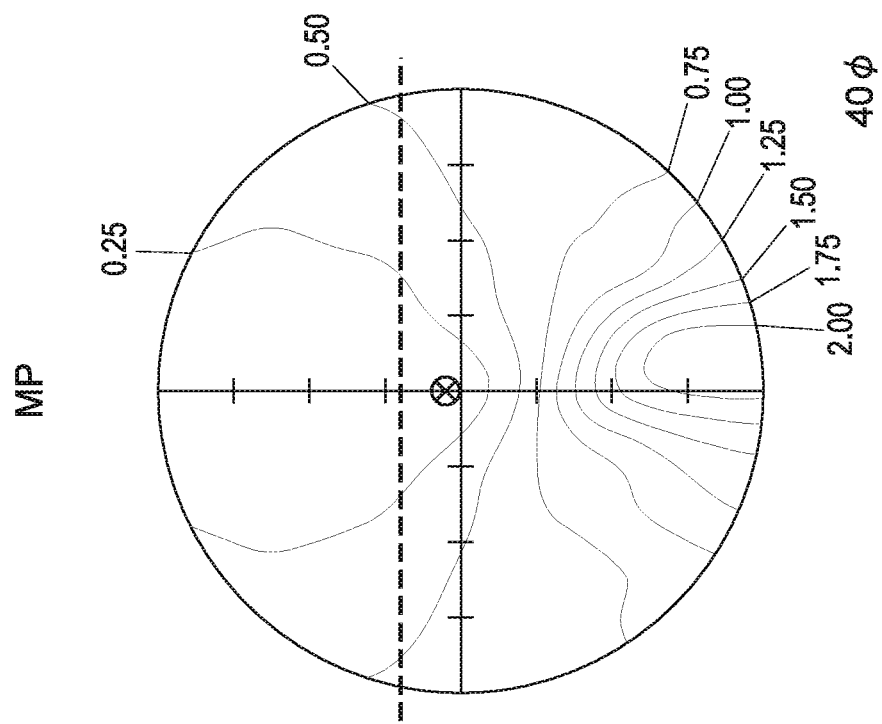
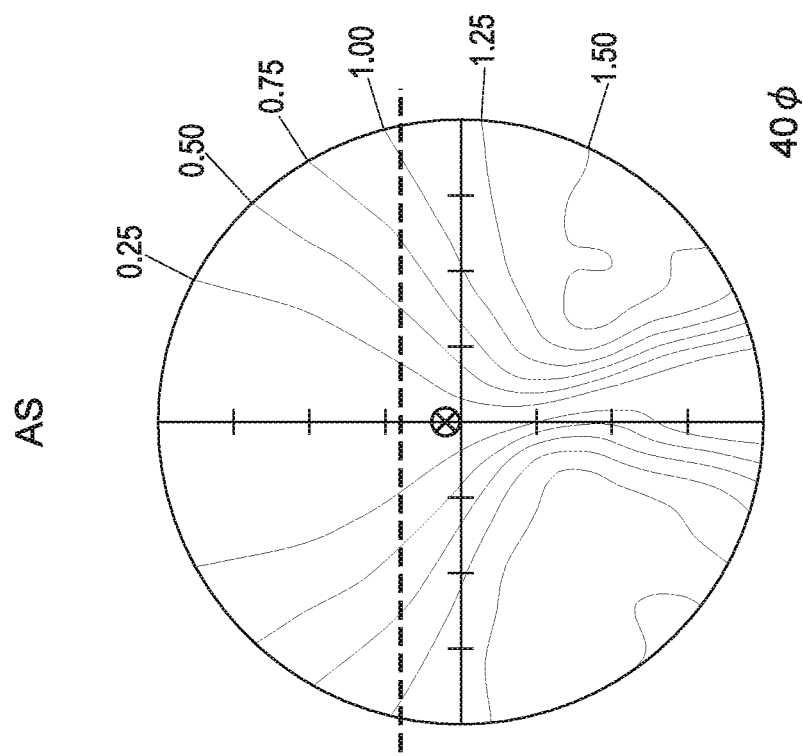
Fig. 13e

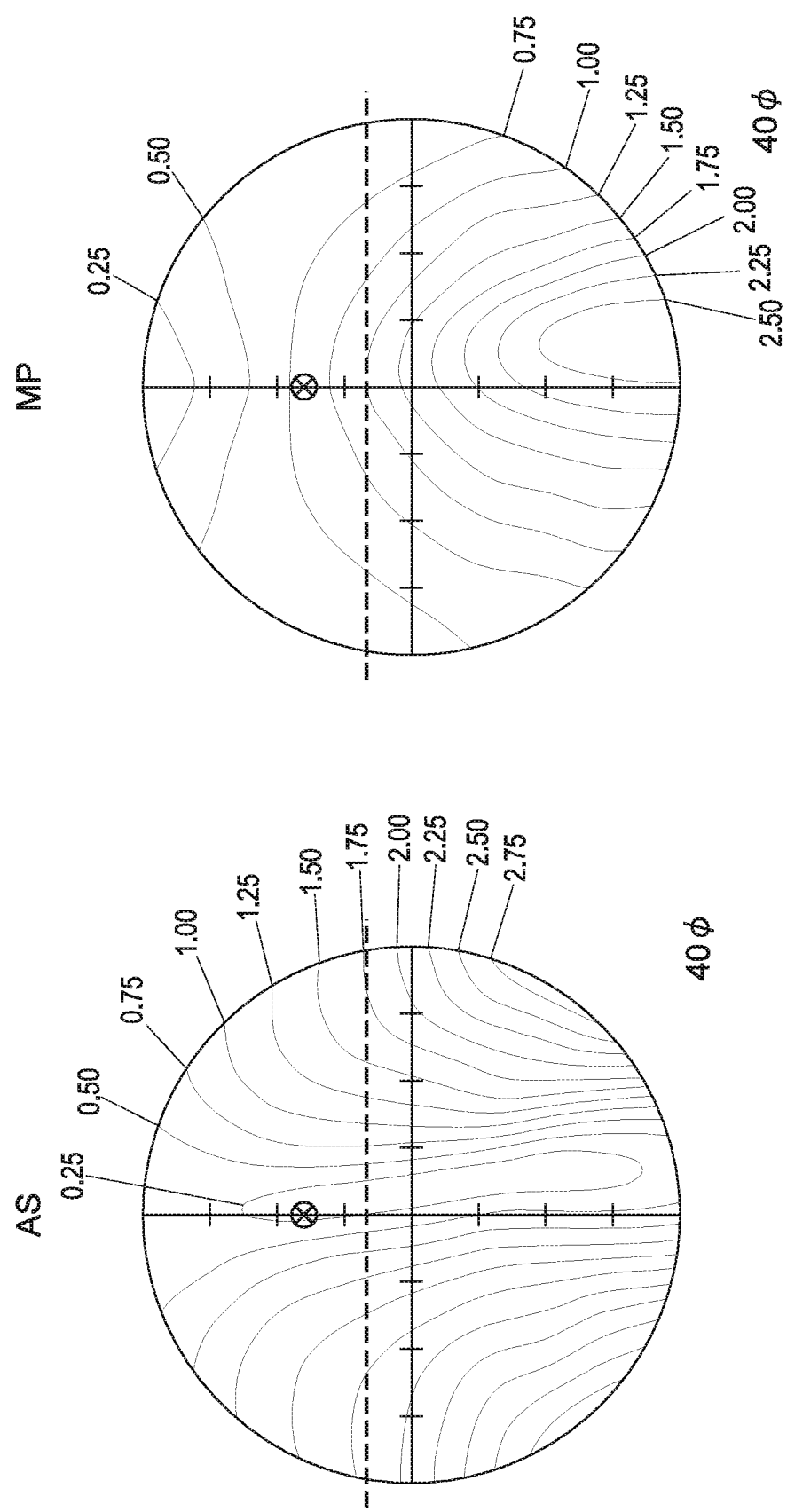

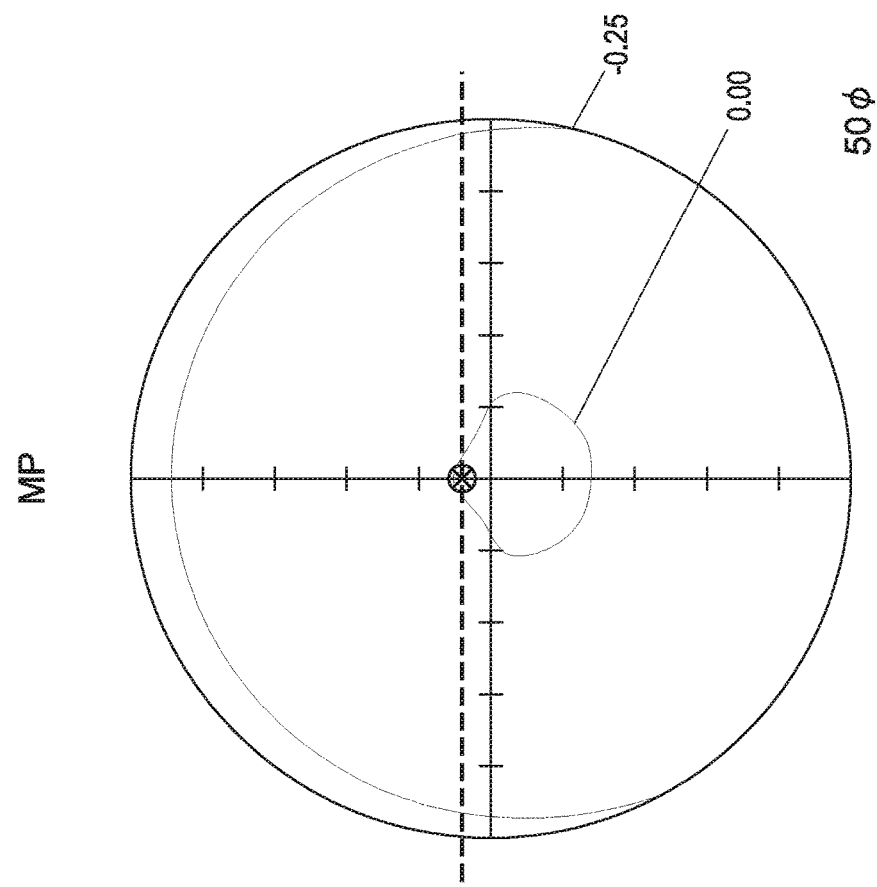
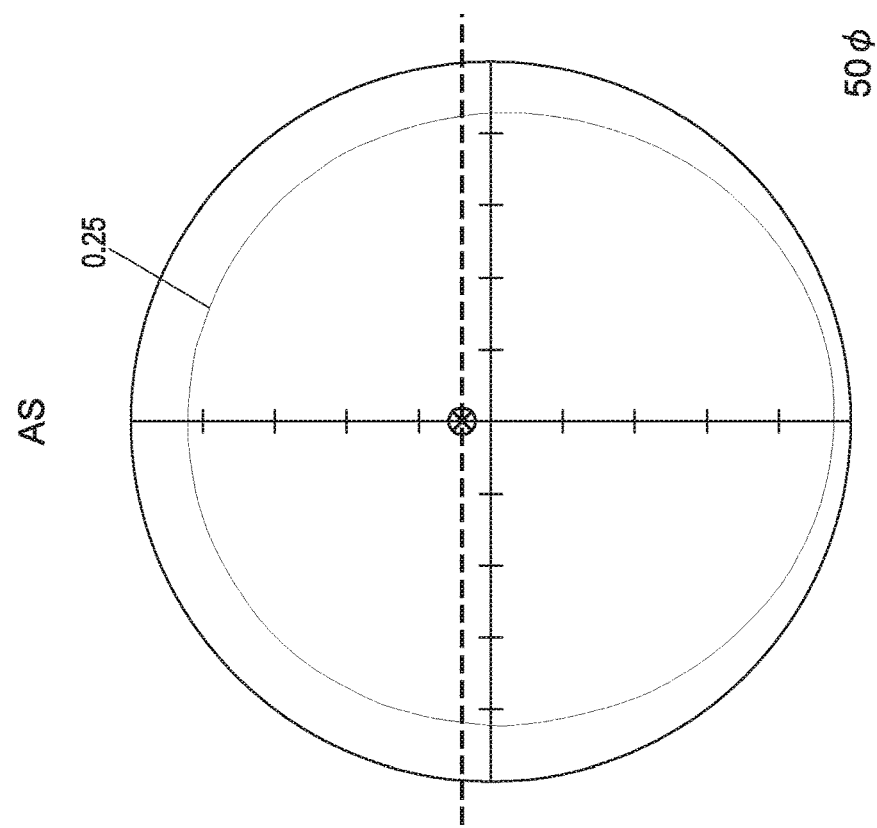
Fig. 15a

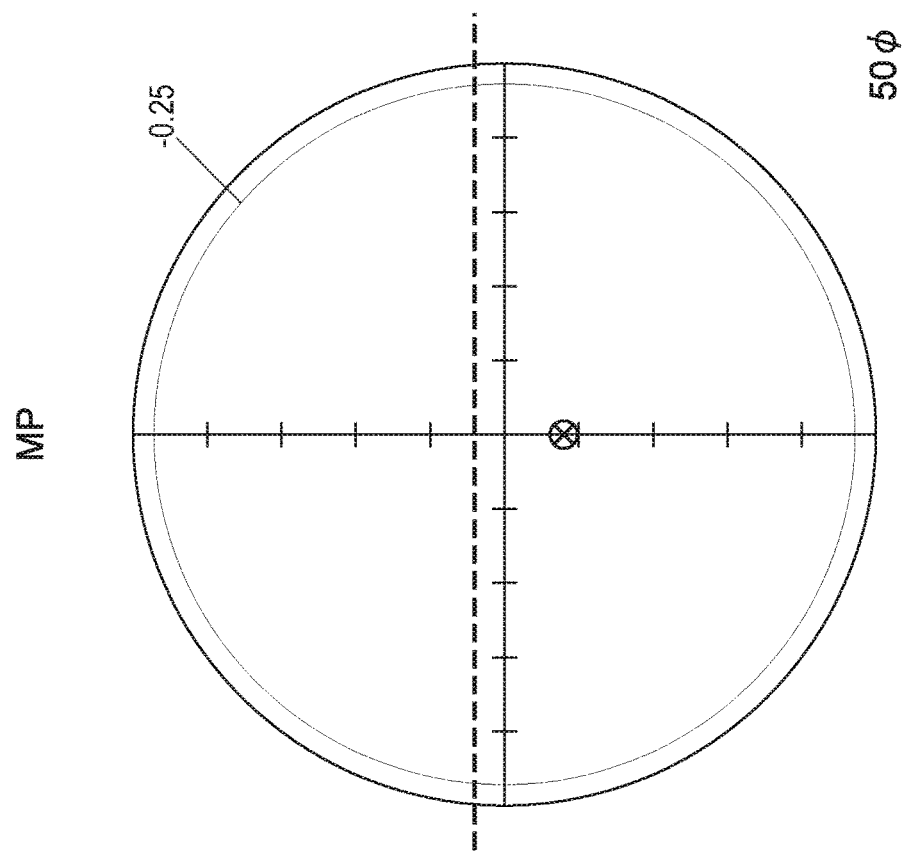
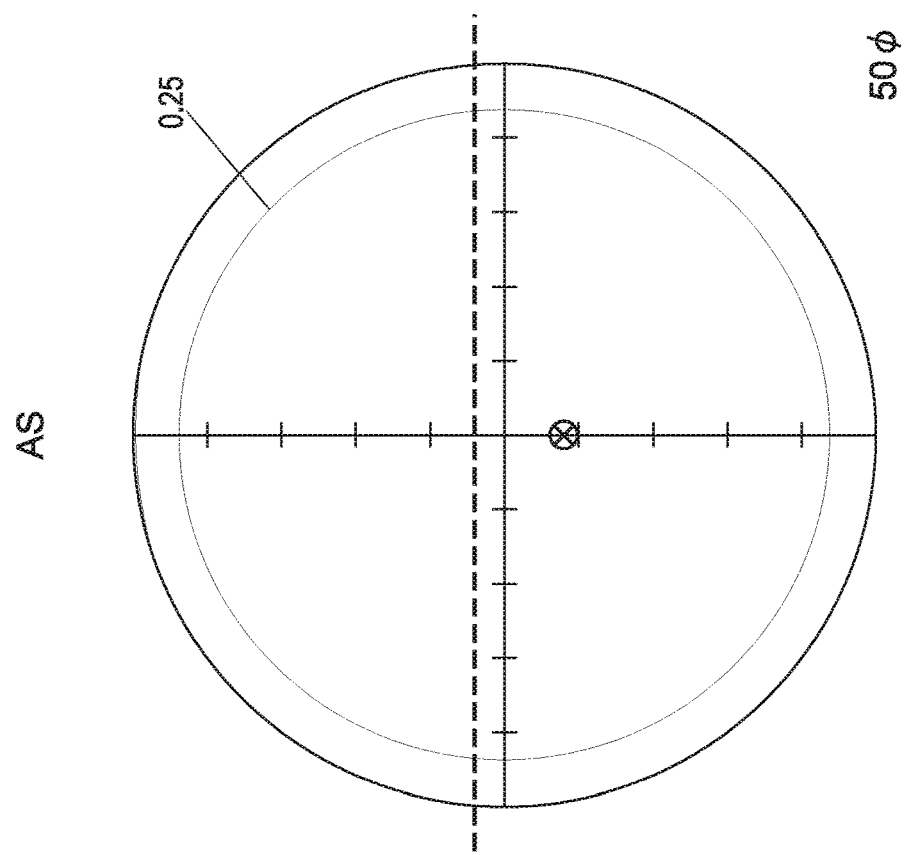
Fig. 15c

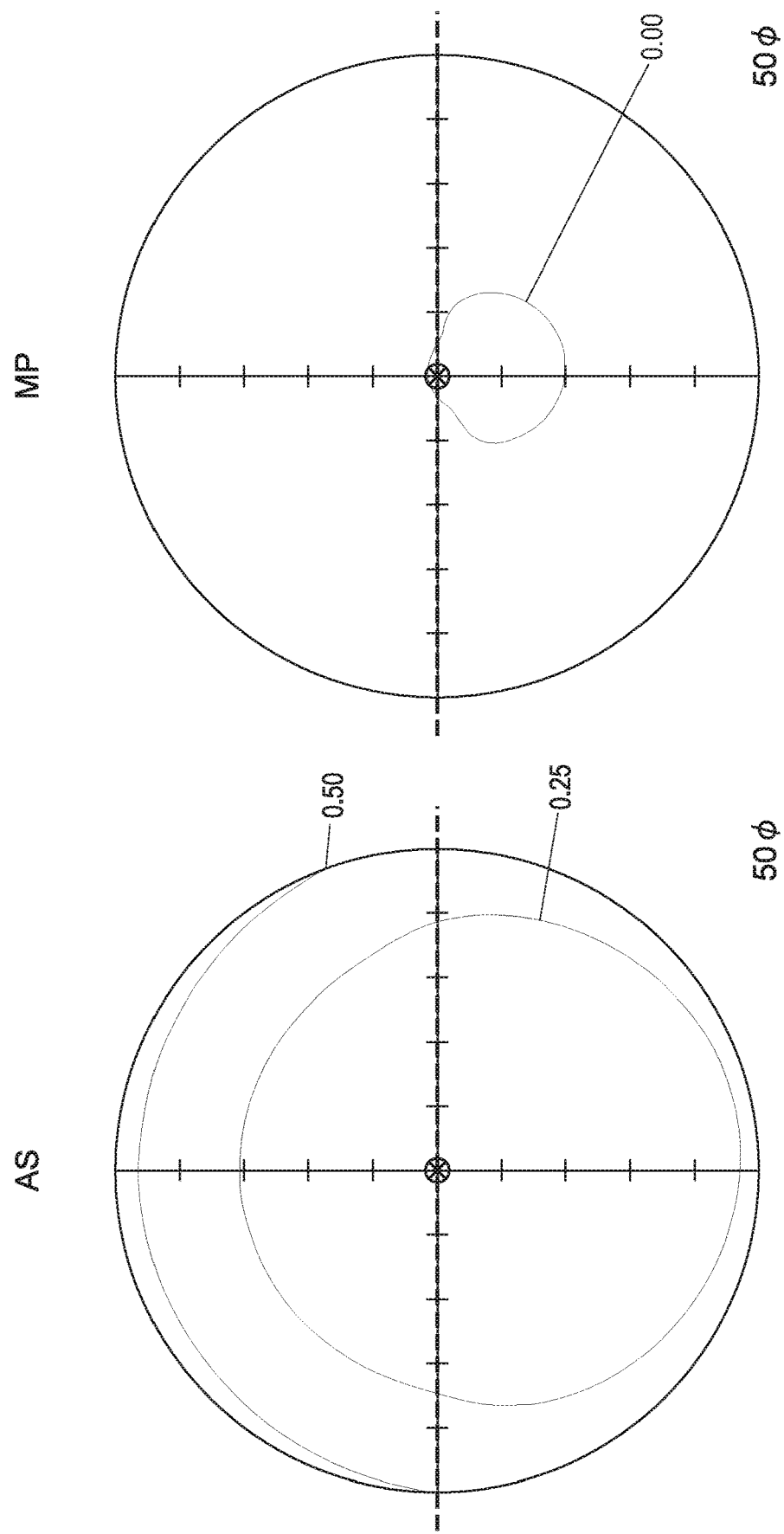

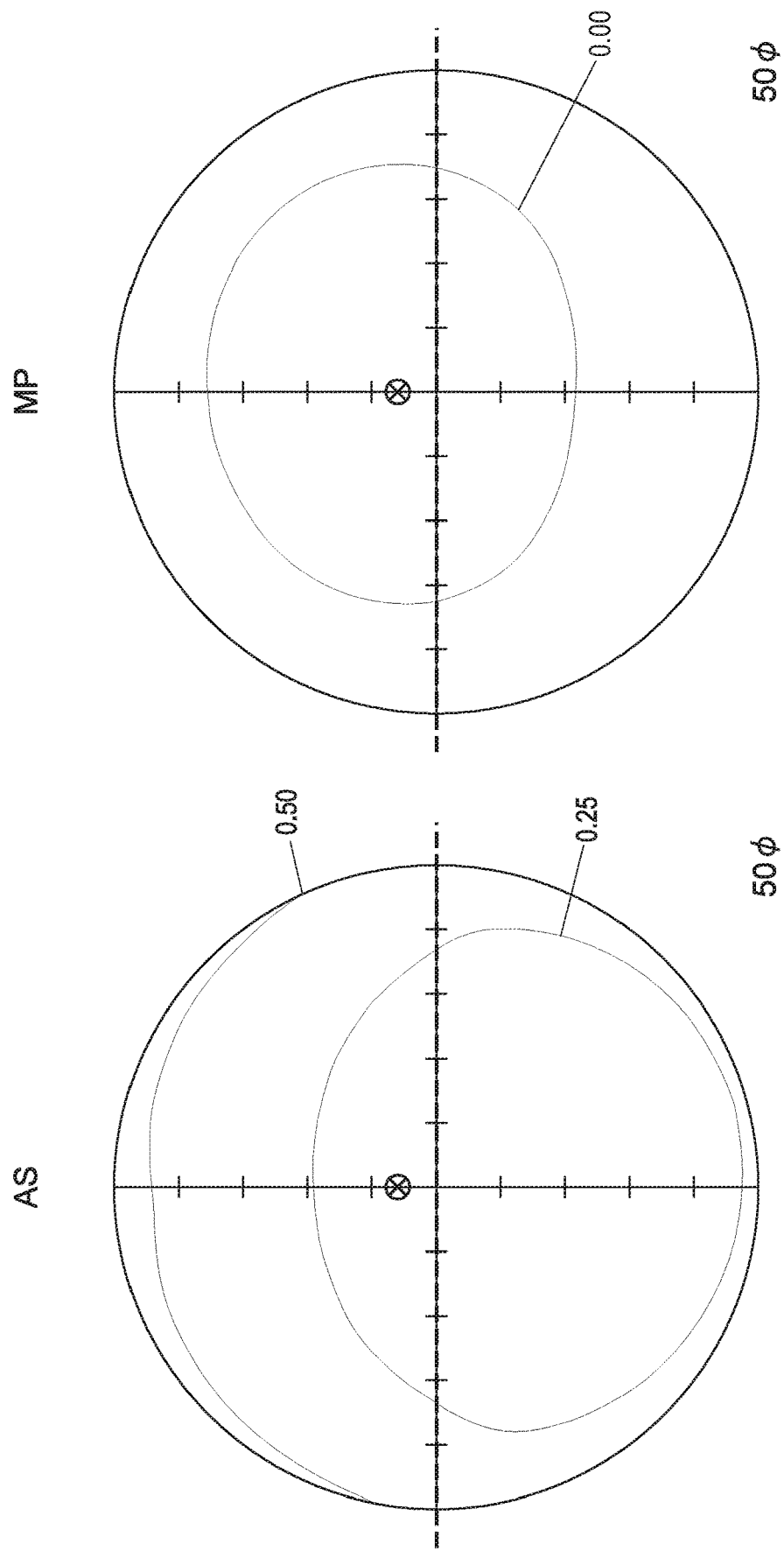

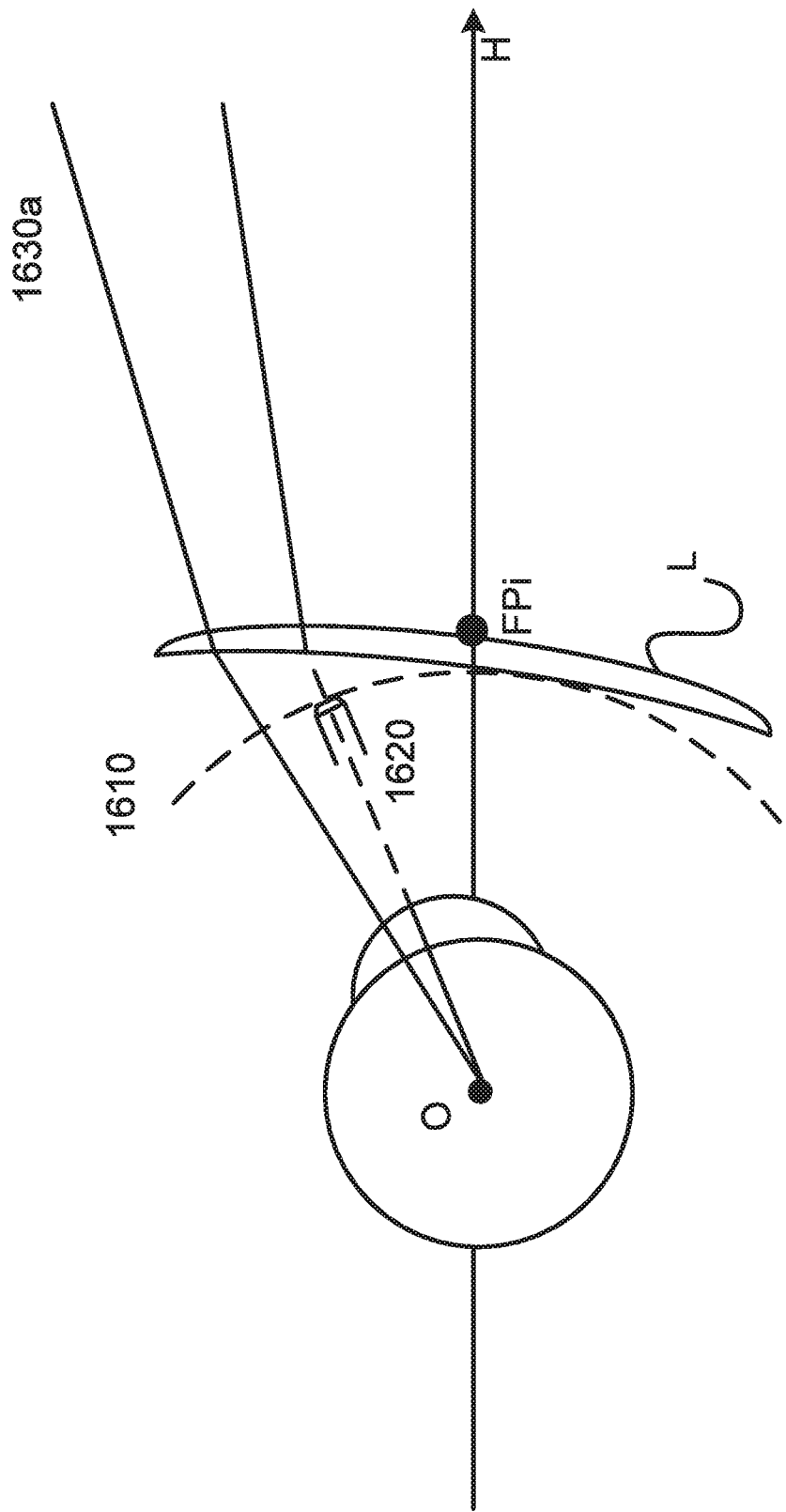

METHOD FOR DESIGNING SPECTACLE LENSES, LENSES AND DEVICES FOR DESIGNING THE SAME

This is a Continuation of International Application No. PCT/JP2017/047420 filed Dec. 26, 2017, which in turn claims the benefit of European Application No. 16207533.7 filed Dec. 30, 2016. The disclosure of the prior applications is hereby incorporated by reference herein in its entirety.

TECHNICAL FIELD

The present invention relates to spectacle lenses, and to methods, devices, system and computer programs for designing spectacle lenses.

Individual spectacle lenses are lenses designed and produced for a specific wearer, and are in fact personalized for the wearer. Being individually designed, the lenses thereby obtained achieve a high vision performance. Such design includes calculating the lens surfaces on the basis of parameters specific for the intended wearer, wherein the parameters are calculated and/or measured for the wearer when the same is wearing the glasses.

At present, digital devices are available to measure the wearing situation of a spectacle frame worn on a user☐s face, further to conventional methods wherein parameters are determined by an optician on the basis of manual measurements. An example of a computer assisted measurement device is also described in U.S. Pat. No. 9,198,576. The parameters measured manually or with such digital devices include pantoscopic angle, vertex distance, face form angle of the spectacle frame, fitting point height, centration point height, etc. The fitting point height can be measured as the vertical distance of a fitting point from the tangent to the lowest point of the lens shape or the vertical distance of a fitting point from the horizontal center line of a boxing system which is a line located at equal distance from the two horizontal tangents of the boxing system, see ISO 13666:2012, boxed center line (or from another point taken as a conventional point for the measurement). The centration point is the aimed point to be located on the lens shape. The centration point can be also defined as the point at which the optical center (e.g. of single vision lens, multi focal lens), design reference point or fitting point (e.g. progressive or degressive lens) is to be located in the absence of any prescribed or thinning prism, or after such prism has been neutralized (see e.g. ISO 13666:2012). The centration point height is also the vertical distance of the fitting point from the tangent to the lowest point of the lens shape or the vertical distance of a fitting point from the horizontal center line of a boxing system which is a line located at equal distance from the two horizontal tangents of the boxing system, see ISO 13666:2012. In addition, there is the pupillary distance (PD) which is the distance between right pupil and left pupil of user☐s eyes measured with ruler or PD meter. For accurate dispensing of the spectacle lenses and frame, it is recommended to measure PD monocularly in right eye and left eye from the center line of the bridge of user☐s nose. To order the spectacle lenses which are tailored to user☐s individually measured parameters (tailor made design, or individual design), the measured parameters, prescription power information, product name of the lens, color and coating etc. are information typically provided to the manufacturer. In such a way, the manufacturer can produce individual lenses customized for the wearer, since the lenses can be designed by having knowledge of the accurate position between lens surfaces and eyes, thus optimizing the lens performance. The more individual parameters are provided, the higher the performance.

Also, a fitting point is defined as the point on the front surface of a lens or semi-finished lens blank stipulated by the manufacturer as a reference point for positioning the lens in front of the eye, see ISO13666:2012. The fitting point may be determined on the basis of the alignment reference markings provided as permanent markings on the lens (see ISO 8980-2 for the permanent markings). For instance, the fitting point may be (but not necessarily) placed on the line passing through two alignment reference markings or the point 4 mm higher from the line on the vertical line passing at the center point of two permanent markings etc.

FIG. 1 shows an illustrative process for obtaining individual lenses. Wearer☐s parameters can be obtained in step S1-3, and transmitted to the manufacturer, which generates in step S1-6 design data (data describing lens surfaces, e.g. in the form of a lattice, curves, etc.). Lenses are then machined in step S1-7 on the basis of the design data, and in step S1-8 are mounted into the frame such that the spectacles can be fitted on the user's face (final fitting). In this way, lenses can be finally delivered to the wearer.

FIGS. 2(a) and 2(b) show two conventional different (also combinable) ways of describing (characterizing) individual parameters on the basis of which the individual lenses can be designed. In particular, FIG. 2(a) relates to so called frame based parameters like FCD (Frame Corneal Distance) and WPA (Wearers Pantoscopic Angle); FIG. 2(b) relates to so called lens based parameters like CVD (Cornea Vertex Distance) and PA (Pantoscopic Angle), wherein HCP indicates the point on the front surface of the lens at the horizontal center line of the boxing system of the lens shape on the V-H plane. Further parameters can be used, like FFFA (Frame Face Form Angle). Each of the mentioned parameters (alone or in combination) can be measured or calculated on the basis of measurements made in step S1-3; the design in step S1-6 is then based on at least one of such parameters. Since the parameters reflect the actual way of using the lenses, the lenses' surfaces can be designed in a way that they exhibit very high visual performance when in use.

To design such individual spectacle lenses tailored to personal condition of each user (i.e. wearer), by using user☐s individually measured parameters when the spectacle frame is worn on the face by the user, it is necessary to accurately and exactly inform the manufacture of information like e.g. the individually measured parameters which are necessary to reproduce the positioning of spectacle lenses, and/or frame and/or user's eyes.

When designing individual lenses, it is also often determined the typical use that the wearer makes of lenses, like for instance whether the wearer often uses the lenses when driving, and/or reading, and/or doing desk work like in front a computer, etc. This information may be taken into account by the optician when placing the order for a lens, and/or by the manufacturer when designing the lens. For instance, the lenses can be designed to exhibit clear vision properties (e.g. low astigmatism, low aberrations, etc.) in correspondence of an area of the lenses that it typically or most frequently used.

In conventional methods, prescription data (e.g. any or a combination of sph, cyl, ax, prism, prism base setting, addition power) and the individually measured parameters (any or a combination of pantoscopic angle, vertex distance, face form angle of the spectacle frame, pupillary distance/centration distance, fitting point heights or centration point heights for right and left eye etc.) are provided to the lens manufacturer.

However, the inventor found out that the information provided to the lens manufacturer in the conventional methods are not sufficient to reproduce exactly the positioning of spectacle lenses, frame and/or user's eyes, and thus are not accurate enough to provide a very high optical performance for the individual user.

It is thus an object of the invention to improve prior art solutions for designing lenses.

SUMMARY OF THE INVENTION

The object of the invention is achieved by the independent claims, with advantageous embodiments according to the dependent claims and as also further illustrated in the following.

In the following, aspects are described, as well as preferable (i.e. optional) features of such aspects are given. Accordingly (aspects being named A1, etc.):

A1. A method for designing, by means of a computer, at least one surface of a lens for a user, the method comprising steps of:
(i) obtaining (S10) displacement information (dFPH) on an amount of displacement between a user specific fitting position and a reference position, the reference position representing a primary fitting point (FPi) of a lens surface on a reference line of sight (H) of an eye of the user, and the user specific fitting position representing a user specific fitting point (FPm) of the lens surface determined on the basis of the user;
(ii) causing (S20) calculating a design of the at least one surface of the lens on the basis of said displacement information (dFPH).

A2. Preferably, in the method according to aspect A1, said calculating comprises calculating the design of said at least one surface on the basis of design characteristic information representing information corresponding to a design having predetermined characteristics relative to said reference position.

A3. The method according to A1 or A2, preferably comprises a step of determining at least one user specific design parameter for the user on the basis of said displacement information, the at least one user specific design parameter indicating a relative placement between the lens and the face of the wearer.

A4. Preferably, in the method according to A3, said calculating comprises calculating the design of said at least one surface on the basis of said one user specific design parameter.

A5. Preferably, in the method according to any of A1 to A4, said calculating comprises calculating the design of said at least one surface on the basis of surface reference information and user specific design parameter, said surface reference information representing a reference lens surface for said reference position and said user specific design parameter representing a parameter obtained for the user on the basis of said displacement information.

A6. Method according to any of A1 to A5, comprising a step of obtaining a physical lens from the at least one surface designed by the step of causing, and fitting the physical lens at a position corresponding to the reference position.

A7. Method according to any of A1 to A6, wherein said reference line of sight (H) comprises a line of sight at which the eye of the user is under natural head position and natural body posture.

A8. Method according to any of A1 to A7, wherein said reference line of sight (H) is a substantially horizontal line.

A9. Method according to any of A1 to A8, comprising the step of sending said displacement information from a displacement obtaining device to a lens surface design device, and said causing a design comprises causing said lens surface design device to design said at least one surface on the basis of said displacement information.

A10. Method according to any of A1 to A9, wherein said amount of displacement comprises a difference between a height of said user specific fitting position and a height of said reference position.

A11. Method according to any of A1 to A10, wherein said amount of displacement comprises an angle between a user specific line of sight and the reference line of sight, the user specific line of sight being a line of sight passing through the eye's center and the fitting point.

A12. Method according to any of A1 to A11, wherein said amount of displacement comprises an angle between a PRP line of sight and the reference line of sight, the PRP line of sight being a line of sight passing through the eye's center and a prism reference point (PRP).

A13. Method for designing, by means of a computer, at least one surface of a lens for a user, the method comprising steps of:
(i) obtaining, at a displacement ordering device, displacement information relating to an amount of displacement between a user specific fitting position and a reference fitting position, the reference fitting position representing a primary fitting point of a lens surface on a reference line of sight (H) of an eye of the user, and the user specific fitting position representing a user specific fitting point of the lens surface determined on the basis of the user;
(ii) sending the displacement information from said displacement ordering device to a lens design device;
(iii) designing, at said lens design device, the at least one surface of the lens on the basis of said displacement information.

A14. Method for designing, by means of a computer, at least one surface of a lens for a user, the method comprising steps of:
(i) receiving, at a lens design device, displacement information on an amount of displacement between a user specific fitting position and a reference fitting position, the reference fitting position representing a primary fitting point of a lens surface on a reference line of sight (H) of an eye of the user, and the user specific fitting position representing a user specific fitting point of the lens surface determined on the basis of the user;
(ii) designing, at said lens design device, the at least one surface of the lens on the basis of said displacement information.

A15. System (500) for designing at least one surface of a lens for a user, the system comprising an information acquiring entity (510) and a lens design entity (520), wherein the information acquiring entity (510) comprises obtaining means (510A) configured to obtain displacement information (dFPH) on an amount of displacement between a user specific fitting position and a reference fitting position, the reference fitting position representing a primary fitting point (FPi) of a lens surface on a reference line of sight (H) of an eye of the user, and the user specific fitting position representing a user specific fitting point (FPm) of the lens surface determined on the basis of the user; and the lens design entity (520) comprises designing means (520A) configured to design the at least one surface of the lens on the basis of said displacement information (dFPH).

A16. Lens design entity (520) for designing at least one surface of a lens for a user, the lens design entity (520) comprising:

acquiring means (520C) for acquiring displacement information (dFPH) on an amount of displacement between a user specific fitting position and a reference fitting position, the reference fitting position representing a primary fitting point (FPi) of a lens surface on a reference line of sight (H) of an eye of the user, and the user specific fitting position representing a user specific fitting point (FPm) of the lens surface determined on the basis of the user;

designing means (520A) configured to design the at least one surface of the lens on the basis of said displacement information (dFPH).

A17. Design parameter obtaining entity (510) for obtaining information necessary for designing at least one surface of a lens for a user, the design parameter obtaining entity (510) comprising:

obtaining means (510A) configured to obtain displacement information (dFPH) on an amount of displacement between a user specific fitting position and a reference fitting position, the reference fitting position representing a primary fitting point (FPi) of a lens surface on a reference line of sight (H) of an eye of the user, and the user specific fitting position representing a user specific fitting point (FPm) of the lens surface determined on the basis of the user; and communication means (510C) for communicating the displacement information to an entity configured to design at least one surface of a lens for a user on the basis of said displacement information.

A18. Design parameter obtaining entity (510) according to A17, wherein the design parameter obtaining entity (510) includes at least one amongst a measuring device adapted to acquire measurement corresponding to said displacement information, and a computer entity for acquiring said displacement information.

A19. Computer program for designing at least one surface of a lens for a user, the computer program comprising instructions configured to execute, when the program is executed on a computer, all the steps of any one of method aspects A1 to A14.

A20. A lens obtainable from a method according to any of aspects A1 to A14.

A21. A lens (L) having at least one lens surface arranged to be fitted on a spectacle frame in correspondence of a reference position, the reference position representing a primary fitting point (FPi) of the at least one lens surface on a reference line of sight (H) of an eye of the user of the lens, wherein said at least one surface is arranged to exhibit predetermined visual optical characteristics relative to a user specific fitting position, the user specific fitting position representing a user specific fitting point (FPm) of the lens surface determined on the basis of the user.

A22. A lens according to A21, wherein said predetermined visual optical characteristics is one amongst a plurality of visual optical characteristics each relative to said reference position.

A23. A lens according to any of A21 and/or A22, wherein said user specific fitting position and said reference position are separated by a displacement amount.

A24. A lens according to any of A21 to A23, wherein the displacement amount corresponds to displacement information on an amount of displacement between a user specific fitting position and a reference position.

LIST OF FIGURES

Figure 11A:
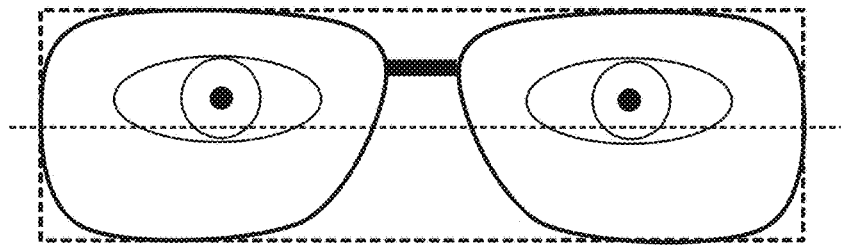
Figure 11B:
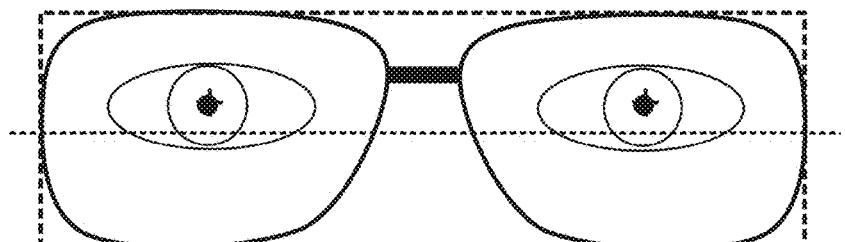
Figure 11C:
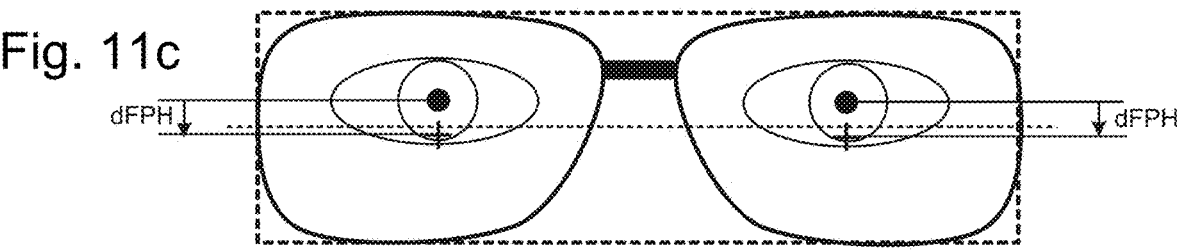
Figure 17:
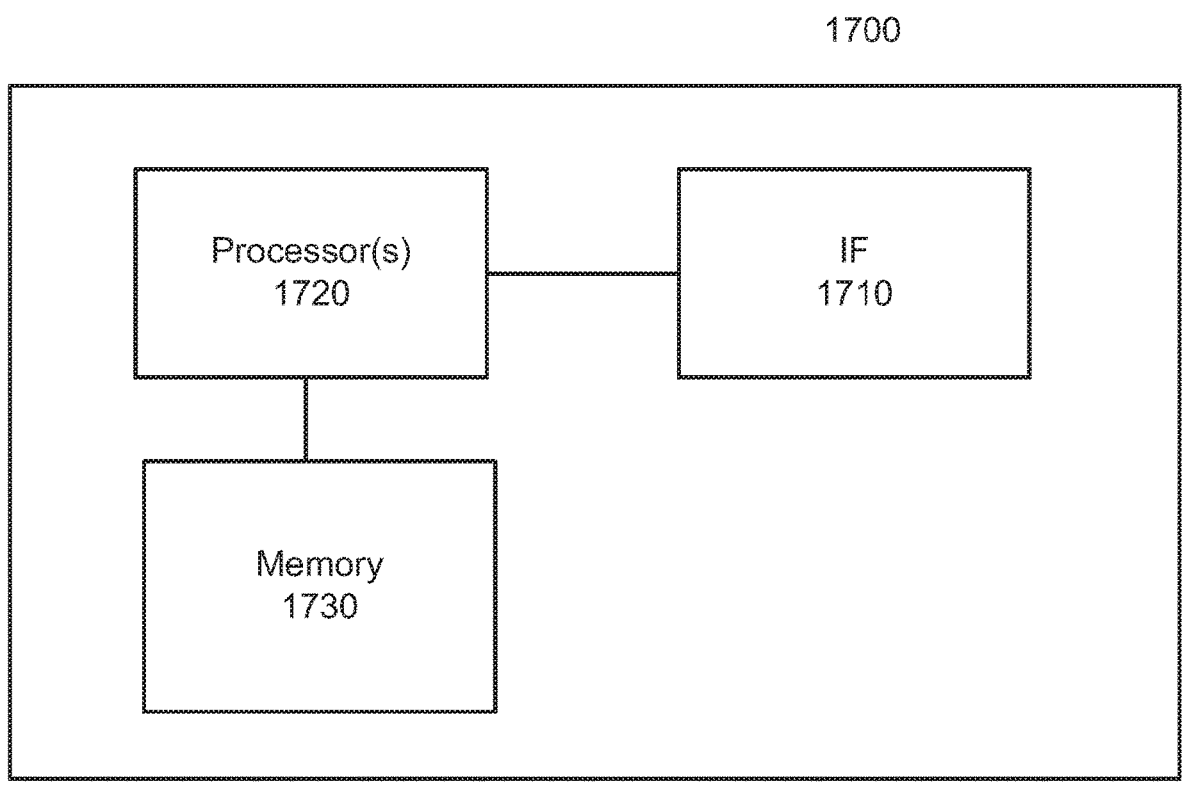
Figure 18:
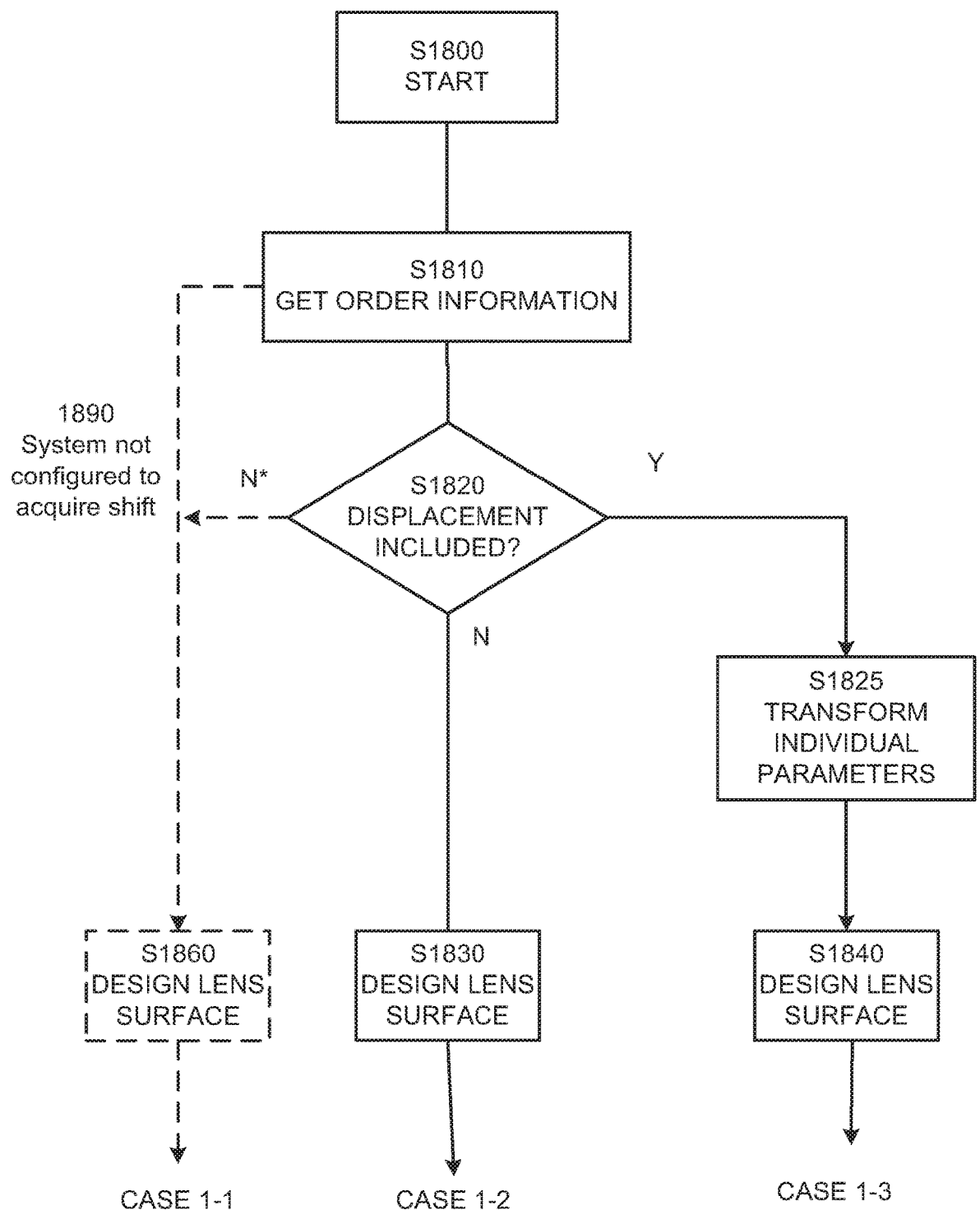

FIGS. 11a, 11b, and 11c are illustrative views for checking the layout of pupils and frame;

FIG. 12 shows a table of values using comparative examples;

FIGS. 13a, 13b, 13c, 13d, 13e, 13f, 14a, 14b, 14c, 15a, 15b, 15c, 15d, 15e, and 15f are maps showing astigmatic behavior (left side of each figure, AS) and mean power behavior (right side of each figure, MP) of lenses according to examples;

FIG. 16 is a schematic view used to explain the values represented in the given map;

FIG. 17 is a block diagram of a computer;

FIG. 18 is a flow chart according to an example of the present invention.

DETAILED DESCRIPTION OF THE INVENTION

In order to facilitate the understanding of the invention and its embodiments, let us consider the case of progressive power lenses (PALs): manufacturers usually recommend opticians to locate the fitting point of PALs at a user's primary position of the eye (which is the position of the eye relative to the head, looking straight ahead at an object at eye level), the primary position being a position at which the user wears the spectacles. Lens manufactures will reproduce the positioning of lenses, frame and eyes when designing the tailor made PALs on the assumption that the fitting points of the PALs ordered by the optician will be located at the user's primary positions of the eyes. However, opticians frequently shift the heights of fitting points of PALs so as to locate them at a position that is higher or lower than the primary position of the eyes according to the usage or the usage environment of the spectacle. When heights of the fitting points are shifted from the primary position of the eyes by an optician, manufactures cannot design correctly the tailor made PALs. Similar considerations apply to the design of single vision lenses (SVL): since the astigmatic and mean power behavior is not uniform throughout the lens, opticians may wish to shift the fitting point depending on type of use so as to provide the best performing area in correspondence of those parts of the lens through which the user will most frequently look through.

Figure 2A:
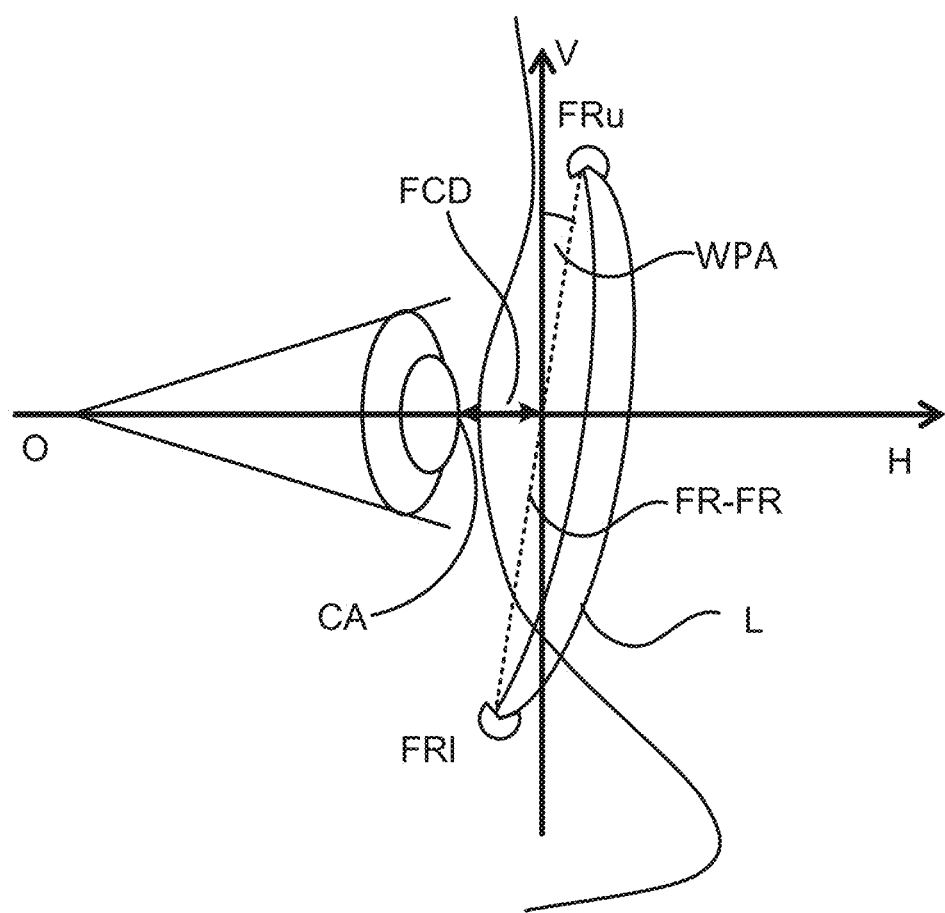
FIG. 2a is a schematic representation showing so called frame based parameters used for designing individual lenses.
Figure 2B:
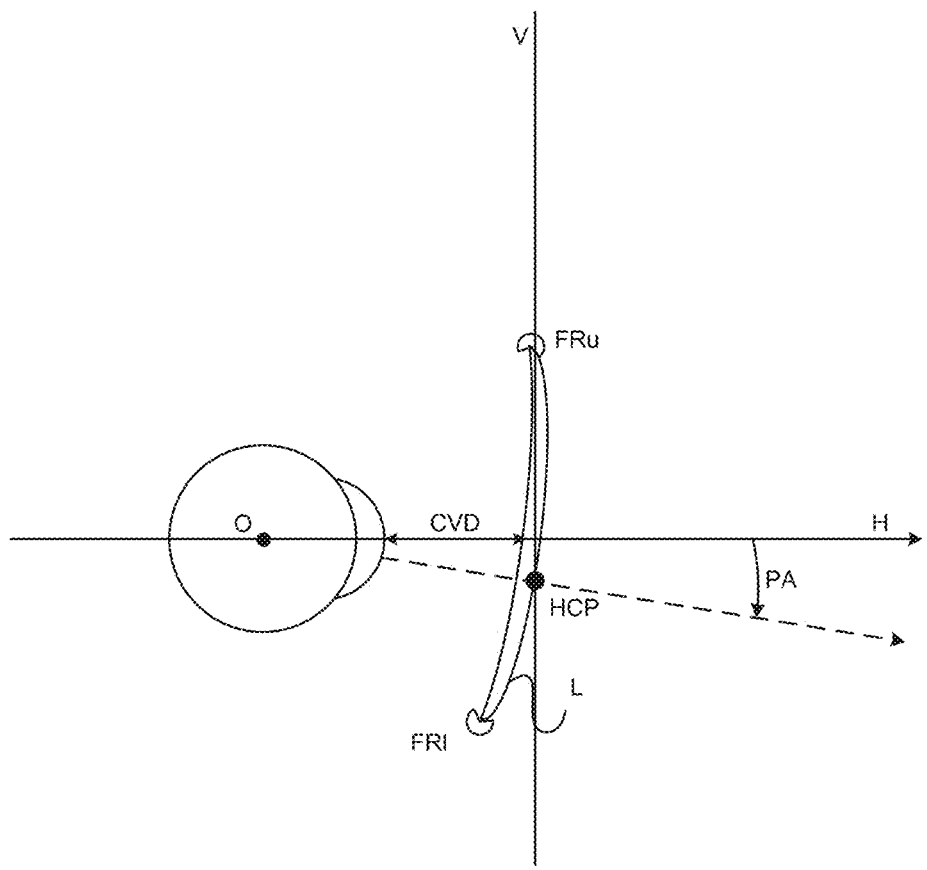
FIG. 2b is a schematic representation showing so called lens based parameters used for designing individual lenses.
Figure 3A:
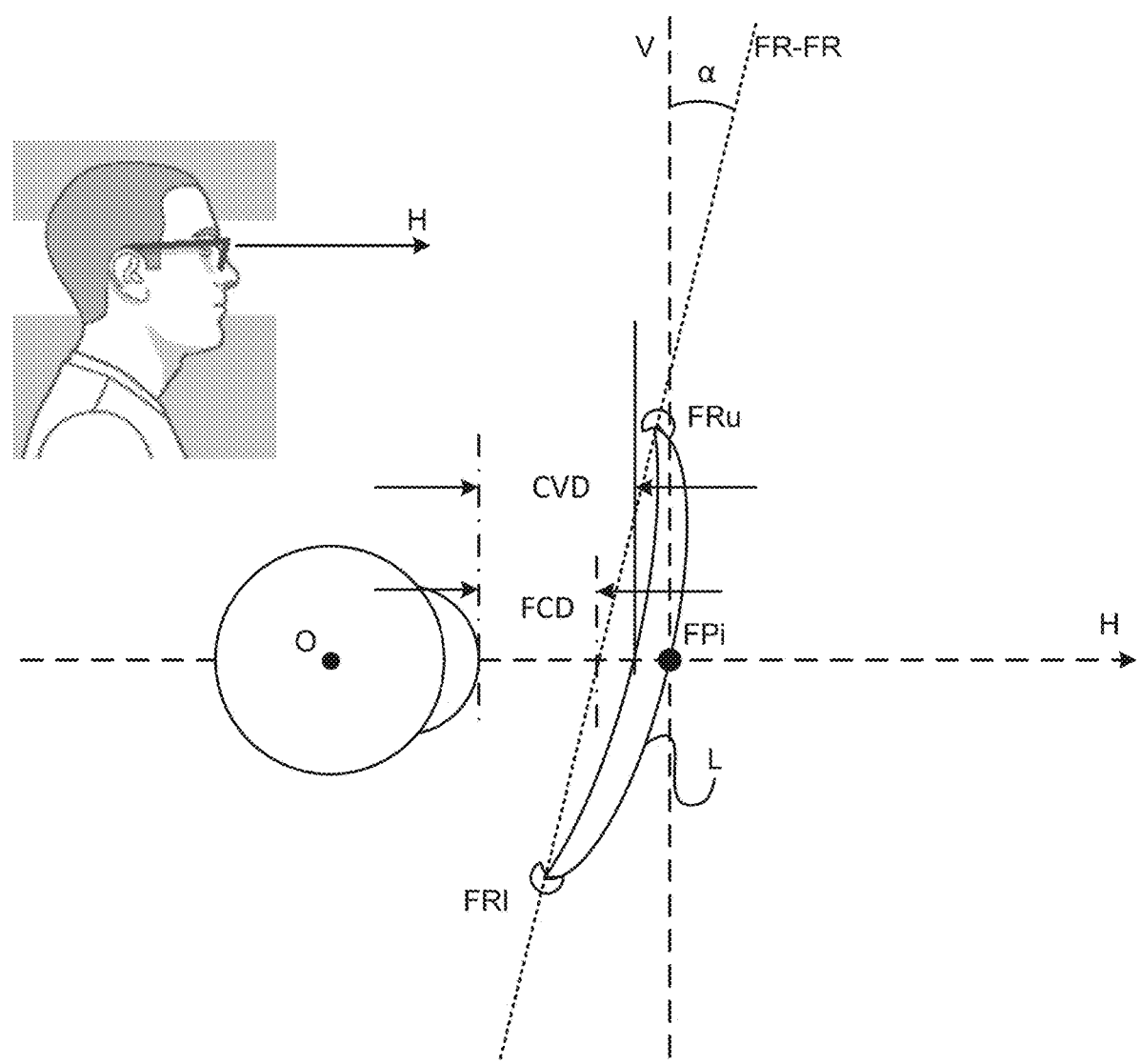
FIG. 3a shows the case wherein the fitting point indicated by the manufacturer is the one actually used by the optician.

The above is also explained with reference to FIGS. 3(a) and 3(b). FIG. 3(a) shows that individual parameters like CVD and FCD (i.e. in case a characterization as in FIG. 2(a) or 2(b) is respectively adopted) are obtained when the user wears the spectacles in correspondence of the fitting point FPi which is found on the line H representing the line of sight when the user looks in the horizontal direction. The line H is thus a line passing through the center of rotation of the eye 0 and the fitting point FPi. The line H is typically (but not necessarily) a line substantially horizontal to the ground, or more precisely on a plane horizontal in the sense of parallel to the ground. The line V is a line perpendicular to the line H, and as such typically substantially vertical to the ground. Once the lens L is in place in the frame (represented, in cross section, by upper frame rim FRu and lower frame rim FRl), the frame line FR-FR is defined as being a line crossing with line H which is passing through the centers of the upper frame rim FRu and lower frame rim FRl. The angle α (also WPA) is the angle formed between the lines (or more precisely planes containing lines) V and FR-FR. The parameter FCD (used in the frame based characterization of individual parameters, see FIG. 2(a)) is thus represented by the distance between the corneal apex CA and the frame line FR-FR along the line H (on the line H in FIG. 3(a)). The CVD parameter (used in the lens based characterization of individual parameters, see FIG. 2(b)) is defined as the distance between the corneal apex CA and the point at the inner surface (or back surface, i.e. the surface facing the eyeball) along the line H. (on the line H in FIG. 2(a); on the line H in FIG. 3(a)).

When the above described parameters are sent to the manufacturer, the lens surfaces can be accurately calculated so as to exhibit an accurate visual performance, since the computer can calculate the surface in detail so as to refract incoming rays as accurately as possible in view of the wished properties of the lens. It is noted that not all user individual parameters need to be sent to the manufacturer: for instance, if frame based characterization is used, FCD alone may suffice, or only WPA. Also, other parameters may be sent, and the design device may obtain FCD and/or WPA or other parameters as appropriate and on the basis of the geometry of the spectacle. Preferably, both FCD and WPA (or CVD and PA, in case of FIG. 2(b)) are sent to the manufacturer, which then calculates the lens surfaces when having knowledge of the exact distance where the lens will be placed. By sending individual parameters, it is possible achieving a high visual performance virtually for all surface points, since it is possible to know the accurate distance between the lens surface and the eye.

Figure 3B:
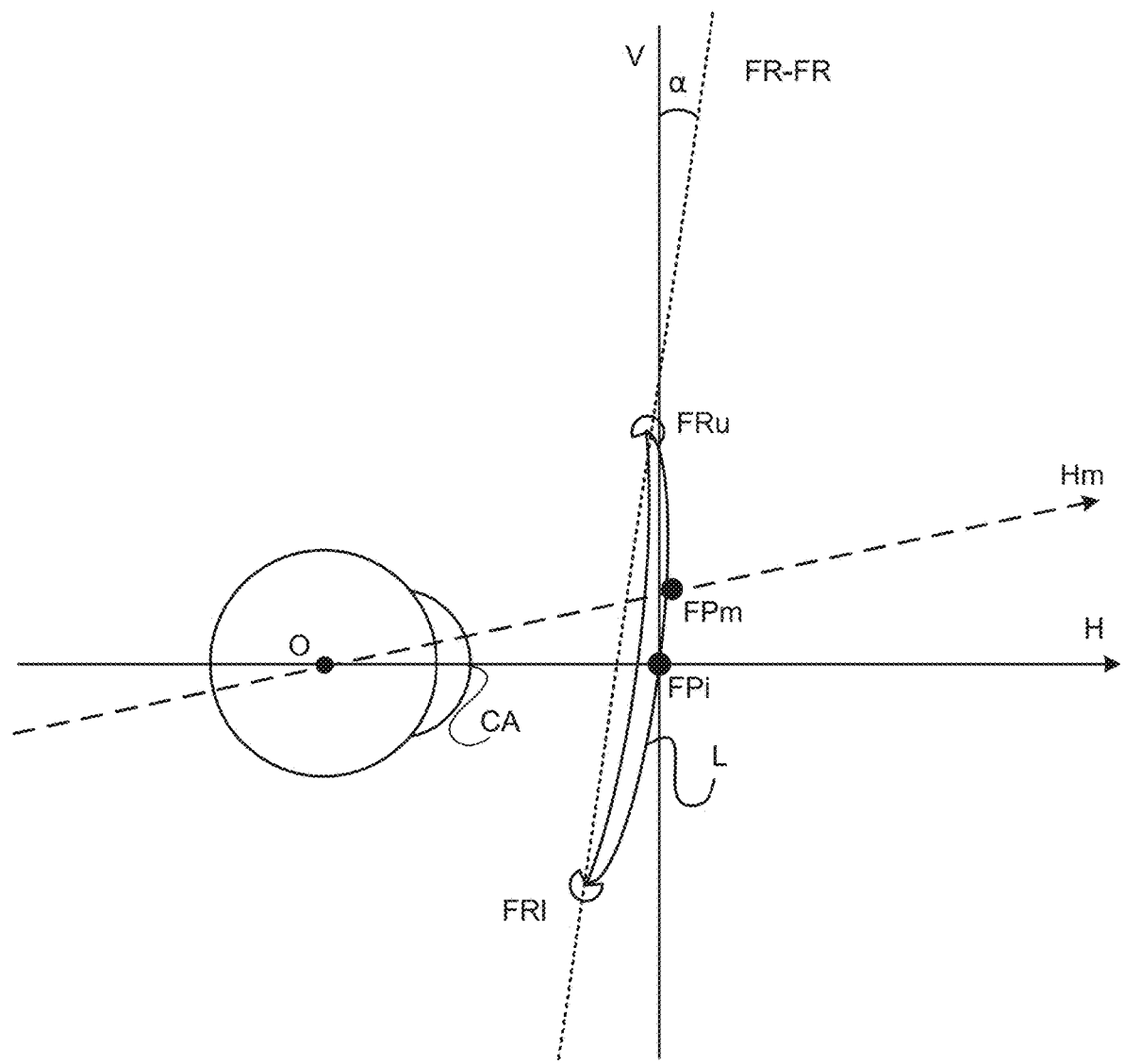
FIG. 3b shows the case wherein the optician shifts the fitting point, when mounting the lens, from the fitting point indicated by the manufacturer.

However, as shown in FIG. 3(b), an optician may shift the position of the fitting point from an initial fitting point FPi to a modified fitting point FPm. The point FPm is a point on the front surface on the lens, and can be either lower or higher than the point FPi. It is noted that the point does not need necessarily be on the front surface as long as it represents a fitting point different from FPi. The line passing through the center of rotation of the eye and point FPm is referenced with Hm, which is herein called also as user's specific line of sight. There are several possible reasons leading an optician to shift the fitting point. For instance, in the case of a PAL, the optician may move the fitting position below the position FPi when he/she determines that the wearer will use the spectacles most frequently when driving. In fact, in such case, by shifting the fitting point downward, it can be expected that the finished lens once mounted will exhibit a wider clear vision area in distance vision, since the expected distribution between far, intermediate and near vision areas will be shifted in a downward direction. Similarly, if the wearer is expected to use the spectacles most frequently while reading, the optician may shift the fitting position in the opposite direction, i.e. upward relative to the point FPi, so that the resulting lens will have a wider near vision area in the lower part of the glasses, and therefore making their use more convenient for reading. In other words, the optician can make an educated guess on how to improve the vision areas in view of the wearer's future type of use by simply shifting the fitting point up or down relative to FPi. It can be said that shifting the fitting point can be considered as an easy way for improving vision areas for a given wearer's lifestyle, instead of resorting to specifying directly other parameters like exact positions of near and far vision areas; this latter case, in fact, would render the calculation of the lens surfaces more complicated than shifting the fitting point. Indeed, shifting the fitting position as above explained is not only easy to apply, but is also considered as accurate.

Figure 3C:
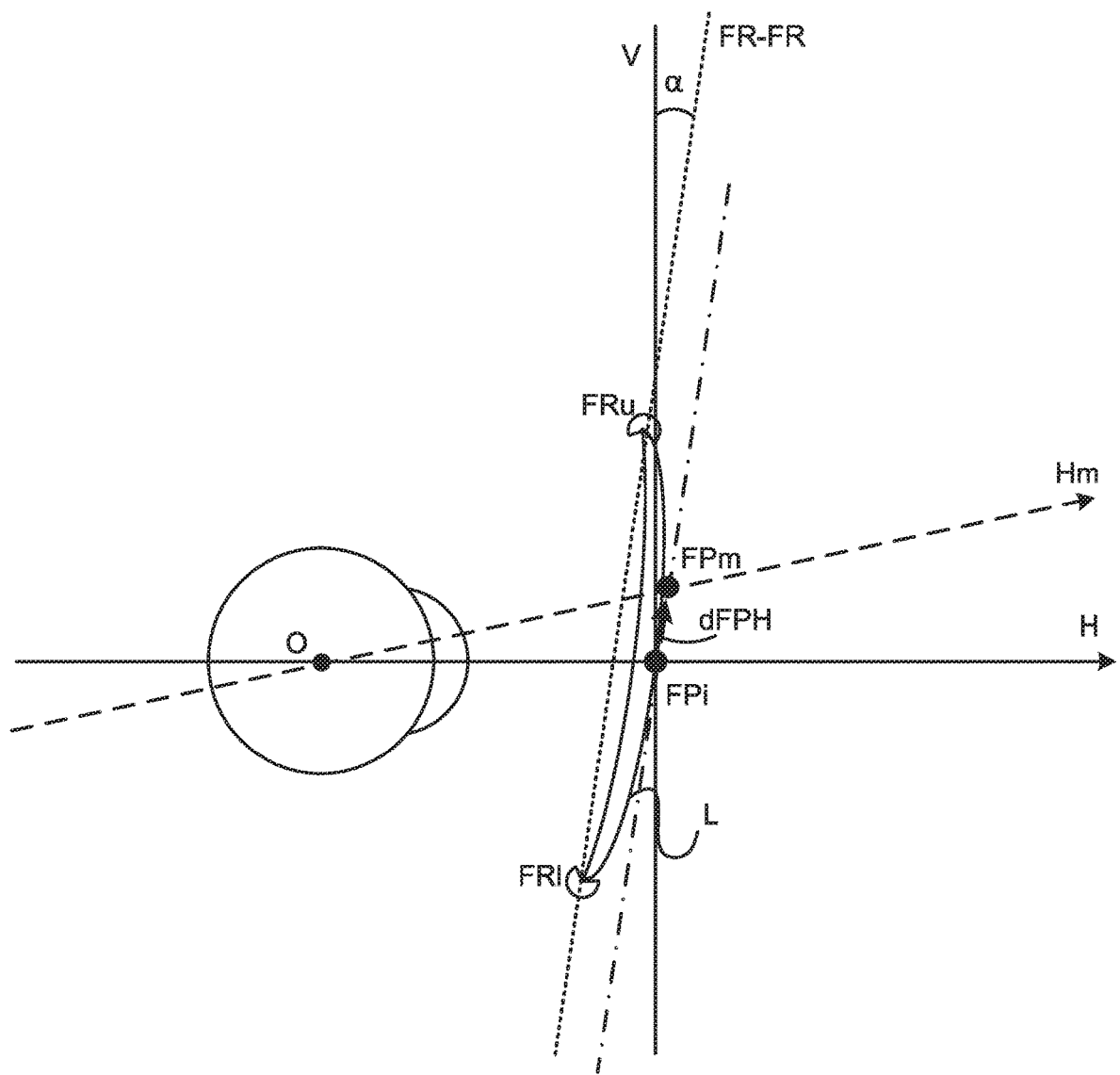
FIG. 3c illustrates how the invention can be applied when the fitting point is shifted.

However, one of the recognition of the inventors is that by applying a shift of the fitting position, the visual performance of the lens decreases, such that a high visual performance cannot be achieved despite the use of individual design parameters. The reason for such loss of performance recognized by the inventors can be explained with reference to FIG. 3c. More in detail, the optician informs the manufacturer of the fitting point height, e.g. a height from the horizontal center point of the boxed frame shape or the bottom of the boxed frame, without however informing the manufacturer that, upon mounting the frames, the fitting point will be shifted. For instance, the optician may order a lens with a fitting point height of +4.0 mm, though when the lens is mounted this point will be shifted below by 3 mm. In this way, a wide far vision area can be achieved since the far, intermediate, and near vision regions or the far and intermediate vision regions are shifted downwards. However, the manufacturer will design the lenses on the assumption that the fitting point FPi (at +4.0 mm) is also on the horizontal line, and that the individual parameter FCD is the one on line H as indicated in FIG. 3(c). However, the modified fitting point FPm is such that the distance FCD' is different from the distance FCD actually provided to the manufacturer, since it is measured on the line Hm and not H. It follows that the manufacturer will calculate the lens surfaces on the basis of a wrong individual parameter FCD as provided from the optician (on the basis of his/her measurement) instead of the actual parameter FCD' corresponding to the actual distance when taking into account the modified fitting point FPm. In one example, let us assume that the optician measures or sets a fitting height from a reference line (obtained for instance from permanent markings) as being equal to +4.0 mm, but however decides to shift such position below by 3.0 mm in consideration of the wearer intending to use the spectacles mainly for driving. At the same time, the optician transmits to the manufacturer an FCD value equal for instance to +11.0 mm. Since the manufacturer is not informed of the intention to shift, the lenses will be designed on the assumption that +11 mm is the individual parameter for the fitting position +4.0 mm. However, when considering how the lens will be really put into use, the actual individual parameter is not FCD, but rather FCD'; in other words, the actual individual parameter is slightly different from +11.0 mm. Further, when an optician decides to shift FPi to FPm and does not inform the manufacturer, the angle between the lens and the line Hm which is the line of sight passing at the shifted fitting point position FPm will be misunderstood by manufacturer for the angle WPA', see FIG. 9. The inventors have found that such wrong parameter leads to a decrease in visual optical performance, which is therefore not desirable. According to a further recognition of the invention, such a problem can be overcome by providing the manufacturer with information about the displacement of the fitting point. On the basis of such information, the manufacturer can therefore derive the correct individual parameter on the basis of which the lens can be more accurately designed.

The above has been introduced with reference to PALs. However, it is noted that the same problem may occur also with single vision lenses (SVL). In fact, in case of SVLs, the entire vision area is not uniform. For instance, astigmatism and/or visual defects in general can occur especially in areas of the lens away from the center. Therefore, the optician may decide to shift the fitting point so that the clear vision area having less astigmatism or less visual defects is shifted in correspondence of the area most frequently used by the wearer. When doing so, the same problem above described occurs, and it can be solved by communicating to the manufacturer information about the displacement.

Figure 4:
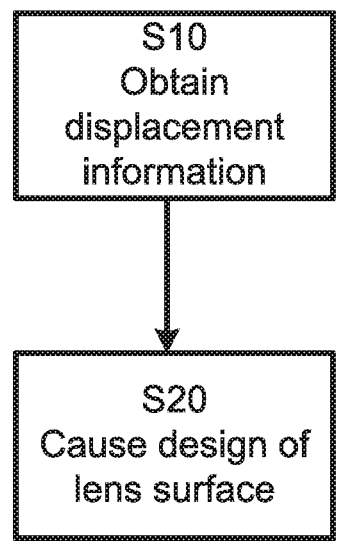
FIG. 4 is a flow chart according to an embodiment of the invention.

With reference to FIG. 4, an embodiment is now illustrated for a method for designing, by means of a computer, at least one surface of a lens for a user (in the sense of a wearer of the spectacles on which the lens will be mounted). The method is applicable to any type of lenses including PALs or single vision lenses, and is preferably applied to individual lenses in the sense of lenses individually designed for a single user. The method comprises a step S10 of obtaining displacement information indicating an amount of displacement between a user specific fitting position and a reference position. The reference position represents a primary fitting point FPi of the lens surface on a reference line of sight H of an eye of the user (see also FIG. 3(c)). The reference line of sight H may be a substantially horizontal line, but needs not be necessarily horizontal; in fact, what matters is that the reference line is known, e.g. by convention, or determinable on the basis of rules, such that such line can be considered as a reference for other considerations. The user specific fitting position represents a user specific fitting point FPm of the lens surface determined on the basis of the user, i.e. for the specific user. The mentioned eye is the one for which the lens is being designed. The displacement information can be obtained by way of manual or automatic measurement; it can also be obtained by calculating the displacement information on the basis of other measured values. The displacement information can be an amount of the displacement, or an indication of such amount (for instance an index referring to a scale of predefined amounts of displacement). Moreover, the displacement information can be information relating or dependent on the amount of displacement: for instance, when the displacement results in an actual value FCD' instead of FCD, the information on the displacement can be the amount of FCD' (since it depends on the amount of displacement) or an information about FCD'. Further, the displacement can be linear (e.g. linear displacement with regard to FCD, CVD) or angular (e.g. angular displacement with regard to WPA, PA). The reference line of sight represents the line of sight of an eye of the user when the user looks straight ahead with natural and habitual head and body posture. The reference position is thus a position substantially representing a reference point of a lens surface on the reference line of sight (preferably it is substantially horizontal, but not necessarily as above explained). The reference position can be the reference point itself, or an information about such a point (e.g. an indirect indication of such a point). In general, it can be said that the reference position is a position on which the lens design is based: as also later illustrated, it can be a position corresponding to (or characteristic of) a stored reference design, or a reference position on the basis of which the design is generated from scratch or modified from a previous design and possibly in consideration of other parameters. The user specific fitting position is determined preferably on the basis of at least one user parameter preferably indicating the expected type of use of the lens. The user specific fitting position can be different from the reference position, but not necessarily, as in fact they can be coincident when no shift of the position is needed; in this circumstance, the displacement is equal to 0. Moreover, the user specific fitting point is typically or preferably taken on the front lens surface; the invention is however not limited to such a case. Therefore, the user fitting position is an information representing a user specific point representative of the position for which certain visual performance wants to be optimized, for instance in view of the expected wearer's usage of the lens. The line passing through the center of rotation of the eye and the user fitting point is typically different from the reference line of sight, with the two lines forming an angle β (not illustrated).

In step S20, the method causes the calculation of a design of at least one surface of the lens on the basis of the displacement information. The steps of obtaining and causing imply that they can be executed by the same device or by separate devices: for instance, a single device could be configured to obtain the data and perform the design as a consequence of the displacement information obtained; in another example, a first computer device, preferably placed at the optician premises, obtains the displacement information and sends the same to a design server which is thus caused to perform the design. In a further example, the server is configured to obtain the displacement information either as directly input by an operator or as transmitted electronically, with a software or hardware component on the server causing the calculation of the design. Calculating the design means performing computer operations in order to obtain data describing the at least one surface of the lens when taking into account the displacement information; such data can be in the form of a lattice of points (for any types of lenses, including PALs and SVLs), or one or more functions describing a curve modeling the surface, or any other way for describing the surface to be machined. The calculation can be done from scratch when having knowledge of parameters representing constraints to be met, the parameters including for instance prescription information (when present), individual parameters (including e.g. measurement relating to the frame and/or distance to the eye) and the displacement information.

Optionally, in the method of the present embodiment, the calculating comprises calculating the design of the at least one surface on the basis of design characteristic information representing information corresponding to a design having predetermined characteristics relative to said reference position. In other words, on the basis of the design characteristic information, a corresponding design can be obtained, the design exhibiting certain properties or characteristics relative to the reference position. It can thus be said that the design characteristic information are representative of a certain design having certain characteristics relative to the reference position. For instance, the optician may select one characteristic design from a list of available characteristic designs, like for instance clear design (e.g. a design that has as priority criteria obtaining a vision area as clear and uniform as possible, relative to the reference position), soft design (e.g. design that has very soft changes between properties of different areas, relative to the reference position), far vision design (e.g. one where far vision area has less distortion than other areas, relative to the reference position), etc. Once a design is selected, the corresponding design characteristic information are selected and used for the design. Such information can be an identification of the selected design, or the parameters themselves to be used for the design, or any other information that allows identifying the respective characteristics or the selected design. The design is then based on such information: for instance, a specific program or function suitable for a design corresponding to the characteristic information is run, such that a lens having the intended characteristic is obtained. In another example, specific parameters corresponding to the design characteristic information are used for designing the lens surface. Also, characteristics design may be stored in advance (in any form, e.g. as points or as curves) in correspondence of the design characteristic information, and used as a basis for obtaining the actual surface design. By using the displacement information and the design characteristic information, it is possible to accurately design the lens. In fact, since the design characteristic information (or the corresponding design) are relative to the reference position, they may alone not create an accurate design when the fitting position is shifted; thus, by using also the displacement information, adaptations and/or corrections can be made in the design process, in order to reflect the actual relative position between lens and eye; as a result, it is possible to obtain a lens that exhibits the selected characteristic accurately on the basis of the actual fitting of the wearer. In a further illustrative example of a PAL, the characteristic design may represent a series of parameters like the distribution between distant, intermediate, and near vision areas leading to a characteristic behavior for astigmatism and mean power; or, in another example, the characteristic design can be a lattice point providing a characteristic distribution of distant, intermediate, and near vision areas. In a further illustrative example of a single vision lens, the characteristic design can be one characterized by a certain distribution of astigmatism and mean power over a certain area. The characteristic design can be chosen amongst a plurality of characteristic design data, each characterized by one or other parameters, and preferably indexed such that a suitable characteristic design can be conveniently retrieved. Having knowledge of the displacement information and the design characteristic data, it is possible to accurately model the optical system formed by the lens and the eye and modify and/or adapt the characteristic design in order to obtain an accurate design data that reflects the individual parameters and the user specific fitting position. Similar considerations apply to illustrative examples wherein calculating the design is made from scratch: in this scenario, a model of the eye and lenses can be accurately prepared, and starting from constraints to be met by the lenses (e.g. desired distribution of astigmatism and/or mean power; width and height of clear vision area for SVLs, or distribution of distant, intermediate, near visual areas for PALs) it is possible to determine an accurate surface that satisfies all constraints including prescription data and the user specific fitting position.

Optionally, the method of the present embodiment comprises a step of determining a user specific design parameter for the user on the basis of the displacement information. Preferably, the at least one user specific design parameter indicate a relative placement between the lens (when fit on the spectacle frame) and the face of the wearer, or between the frame and the eye. For example, starting from parameters like FCD, CVD, WPA, etc., user specific design parameters like FCD', CVD', WPA', etc. are determined on the basis of the displacement information. These parameters more accurately describe the relative position or relative placement between the lens (once mounted) or the spectacles and the wearer's eye. For instance, on the basis of the displacement information dFPH, the correct FCD' value can be calculated, and the surface of the lens is designed accurately on the basis of the exact FCD' value calculated for the user specific position, i.e. for the actual fitting position at which the user will fit the physical lens when wearing it. The user specific design parameter can be determined by the same device calculating the design, or by a different device like for instance the device performing measurement(s); in another example, the user specific design parameter can be input, or directly measured in correspondence of the user fitting as illustrated in FIGS. 2a and b. Importantly, the amount of displacement referred above in relation to step S10 comprises either specifying the amount of displacement (linear or angular), or providing the user's specific parameters calculated on the basis of the amount of displacement, or providing the specific parameters on the basis of measurements thereof.

Optionally, the step of calculating comprises calculating the design of the at least one surface on the basis of one user's specific design parameter. For instance, having knowledge of the linear displacement dFPH, it is possible to calculate the correct value for FCD' and therefore to obtain lens surface design data that is accurate for the user specific position, i.e. for the actual fitting position at which the user will fit the physical lens when wearing it. The user specific design parameter can be determined by the same device calculating the design, or by a different device like for instance by the device measuring the same, or by inputting the displacement information, or by measuring the lens fitting parameters described in FIGS. 2a and b. Importantly, the amount of displacement referred above in relation to step S10 comprises either specifying the amount of displacement (linear or angular) or providing the user's specific parameters calculated on the basis of the amount of displacement.

Optionally, the step of calculating comprises calculating the design of the at least once surface on the basis of one user's specific design parameter. For instance, having knowledge of the linear displacement dFPH, it is possible to calculate the correct value for FCD' and therefore obtain lens surface design data (similar considerations for other parameters listed in FIG. 2(a) and/or 2(b)).

Optionally, in the present embodiment, the calculating comprises calculating the design of the at least one surface on the basis of a surface reference information and at least one user specific design parameter, the surface reference information representing reference lens surface for the reference position, and the at least one user specific design parameter representing a parameter obtained for the user on the basis of the displacement information. In fact, as also apparent from the previous discussion, it is possible storing a reference design having been previously obtained on the basis of the reference position; the desired lens is then obtained by calculating, e.g. modifying, the reference design on the basis of the displacement information. In this way, the desired lens can be obtained in an accurate way, since the design process will take into account the accurate distances and relative placement of the lens and the eye. In other words, the reference surface can be predetermined relative to the reference position. In further other words, the reference position can be set to a position ▢around which▢ or on the basis of which the reference designed is obtained in advance. The reference position may be represented by a point recommended by the manufacturer to be used for mounting the lens on the frames; however, the invention is not limited thereto, as in fact the reference position could be any other point, like for instance a given center of the blank, or a point that can be derived from one or more permanent markings given on the lens, or specified by any other means.

Optionally, the method of the present embodiment comprises a step of obtaining a physical lens from the at least one surface designed at the step of causing, and fitting the physical lens at a position corresponding to the reference position. Fitting includes mounting the lens on its intended frames. For example, the reference position can coincide with the position to be used by the optician for fitting the lenses; however, the actual fitting position for the lens may be different from the reference position such that it can be however determined from the other one, or in correspondence with the other one. It can also be said that, for instance, the reference surface design is such that its reference line of sight is on a (optionally or preferably, but not necessarily) horizontal line, when considering that the reference surface is a model or template which needs to be further processed. Once obtained, the physical lens is mounted such that the user specific fitting point becomes the point referred to by the optician fitting the lens, such that this may not be found anymore on the reference line but displaced from it by an amount corresponding to the amount of displacement.

Optionally, the reference line of sight comprises a line of sight at which the eye of the user is under natural head position and natural body posture. In other words, it can also to be said that it is a line of sight at which the wearer is at rest, or a line of sight at which the user is looking at when the head is in a normal position and the posture is normal.

Optionally, the reference line of sight is a line substantially horizontal relative to the ground.

Optionally, the method comprises a step of sending the displacement information from a displacement obtaining device to a lens surface design device; in such case, the step of causing comprises causing the lens surface design device to design the at least one surface on the basis of the displacement information. Preferably but not necessarily, the displacement obtaining device is located at an optician shop or laboratory, while the lens surface design device is preferably located at a manufacturer site. The two devices may also function as a client and a server. Moreover, the displacement obtaining device may be represented by a computer to which the optician or an operator inputs data necessary for ordering the lens. However, the displacement obtaining device may also be represented by, or include, a measurement device adapted to collect directly information on the displacement, including the amount of displacement itself or the individual parameter as measured or as corrected by taking into account the displacement. As also anticipated, the method can also be executed in one single device, i.e. it is not necessary to have a client-server configuration.

Figure 9:
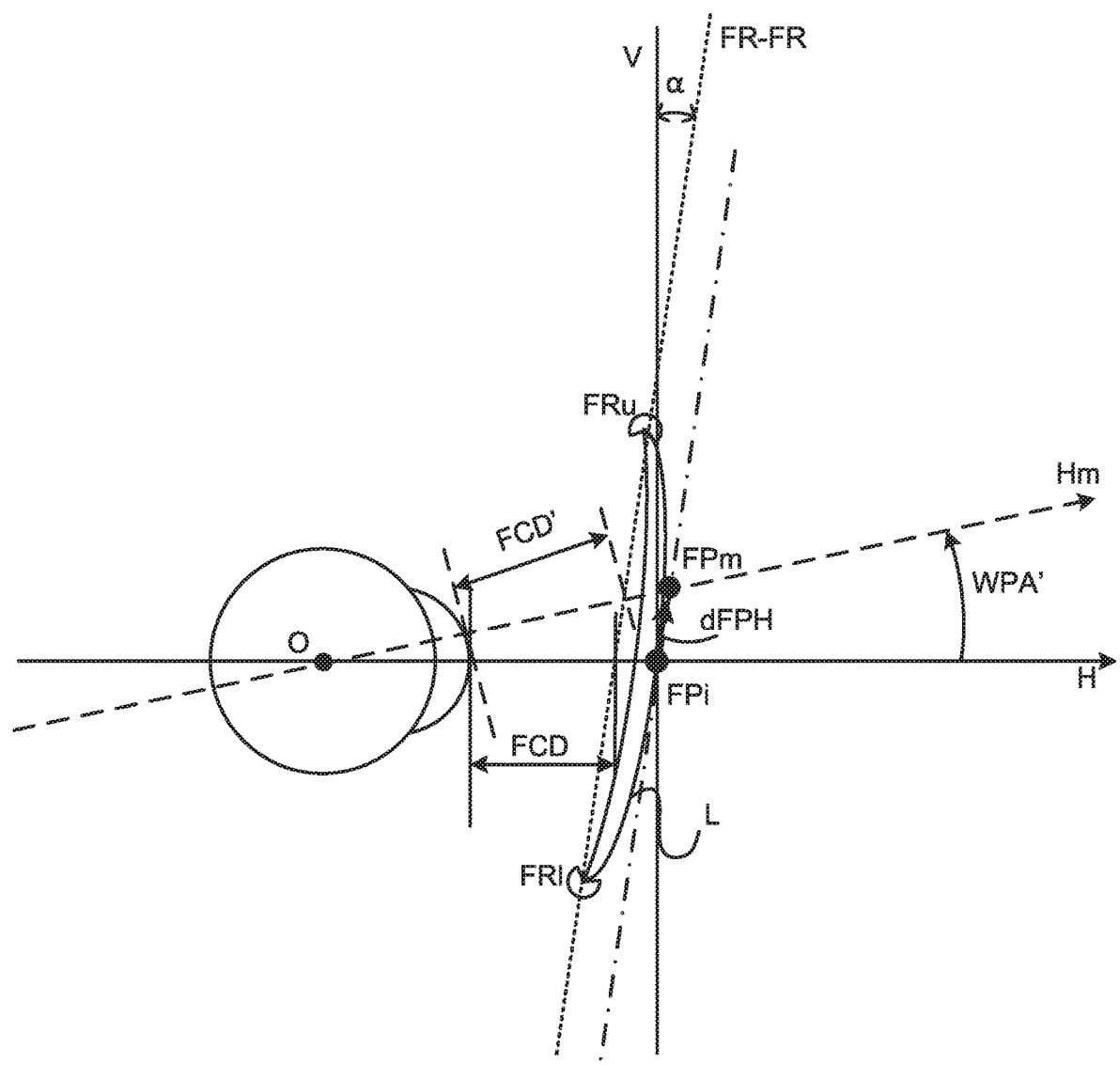
FIG. 9 and FIG. 10 are schematic views illustrating alternative ways for informing the manufacturer of the displacement of the fitting position according to further embodiments of the invention.
Figure 10:
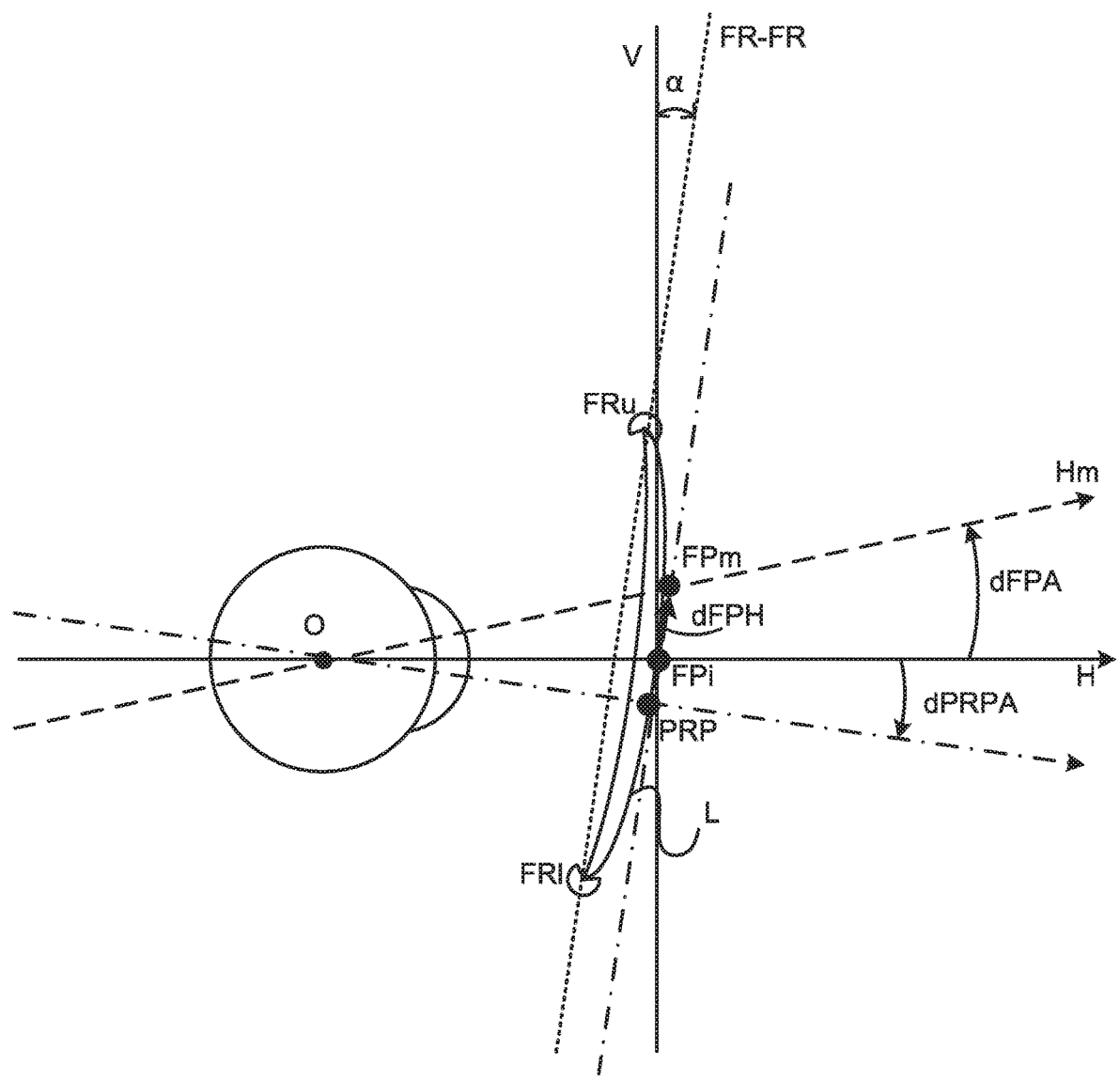

Optionally, the amount of displacement comprises a difference between a height of the user specific fitting position and a height of the reference fitting position. Such heights can be measured relative to a common known point, like for instance the tangent to the lowest point of the lens shape, the point on the front surface of the lens at the horizontal center line of a boxing system of the lens shape on the V-H plane HCP, or on any other point conventionally designated for measuring the heights. Moreover, the amount of displacement can be linear or angular. For instance, see FIG. 3a or FIG. 9, the amount of displacement may be represented by the value dFPH representing the distance (for instance in millimeters) between the reference point FPi and the user specific fitting point FPm. The information on the displacement may therefore be such amount in millimeters, or any other information from which the actual individual parameter (e.g. FCD') is obtained. However, as illustrated in FIG. 9 and FIG. 10, the amount of displacement may also be represented by an angular value (see e.g. WPA' in FIG. 9). Such amount of displacement may be represented by the angular value in degrees (or any other suitable measure), by an information indicating such angular value, or the user specific value corrected on the basis of such angular value amount.

Optionally, in this method, the amount of displacement comprises an angle between a user specific line of sight and the reference line of sight, wherein the user specific line of sight is a line of sight passing through the center of the eye and the fitting point. This is in fact illustrated in FIG. 9, and the angle is indicated by WPA'. The center of the eye 0 is illustrated in FIGS. 2, 3, 8 to 10.

Optionally, the amount of displacement comprises an angle between a PRP line of sight and the reference line of sight, wherein the PRP line of sight is a line of sight passing through the center of the eye and a prism reference point. The angular displacement of the PRP line of sight is also herein referred as dPRPA, see also FIG. 10. It is noted that FIG. 10 also shows the angular displacement between the user specific line of sight and the reference line of sight, there referred as dFPA (displacement of the fitting point angle, or angular displacement of the fitting point).

According to another embodiment (not illustrated, though FIG. 4 also matches to this embodiment), a method is provided for designing by means of a computer at least one surface of a lens for a user of the same lens, wherein the method comprises a step of obtaining, at a displacement ordering device, displacement information relating to an amount on displacement (step S10, performed at a displacement ordering device). The displacement refers to a distance between a user specific fitting position and a reference fitting position, wherein the reference fitting position represents a primary fitting point of a lens surface on a reference line of sight FPi of an eye of the user. The user specific fitting position represents instead a user specific fitting point FPm of the lens surface which is determined on the basis of the user. The method further includes a step of sending the displacement information from the displacement ordering device to a lens design device (a non-illustrated step between S10 and S20 in FIG. 4). The method further includes a step of designing, at the lens design device, at least one surface of the lens on the basis of the displacement information received (step S20 performed at a lens design device). Further considerations as well as further optional steps or features as above described apply also here.

According to another embodiment, it is provided a method for designing, by means of a computer, at least one surface of a lens for a user. The method comprises a step of receiving, at a lens design device, displacement information on an amount of displacement between a user specific fitting position and a reference fitting position, wherein the reference fitting position represents a primary fitting point of a lens surface on a reference line of sight of an eye of the user; the user specific fitting position represents instead a user specific fitting point on the lens surface determined on the basis of the user or for a specific use. The step of receiving can also be seen as a step S10 (see FIG. 4), wherein the obtaining is receiving. The method further includes a step of designing (see e.g. step S20 of FIG. 4), at the lens design device, the at least one surface of the lens on the basis of the displacement information. Therefore, the method described in this embodiment relates to the design by means of a lens design device including a computer for designing at least one lens surface. Similar considerations and optional steps or features above described equally apply here.

Figure 5:
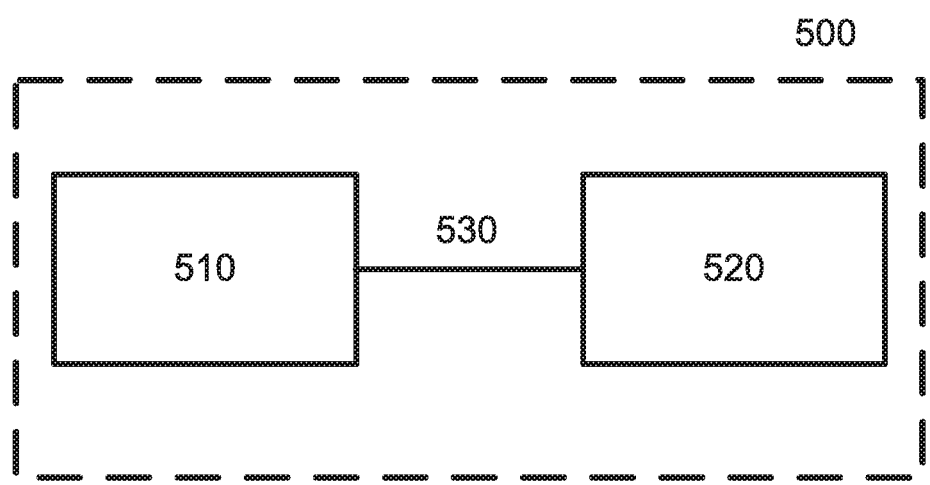
FIG. 5 is a block diagram of a system for designing a lens according to an embodiment of the invention.

With reference to FIG. 5, a system for designing at least one surface of a lens for a user is described according to a further embodiment of the invention. The system comprises an information acquiring entity 510 and a lens design entity 520. An entity can be any combination of hardware and/or software, either concentrated (e.g. in one apparatus) or distributed (like for instance in a cloud solution, or in a client server architecture etc.). The information acquiring entity 510 comprises obtaining means 510A configured to obtain displacement information on an amount of displacement between a user specific fitting position and a reference fitting position, wherein for such positions same considerations made above equally apply here. Furthermore, the lens design entity 520 comprises designing means configured to design at least one surface of the lens on the basis of the displacement information. The obtaining means 510A can also be described as a receiver configured to receive the displacement information, wherein the reception can occur in any form like for instance by input by an operator, or reception from another entity or device in any electronic means of communication. Similarly, the designing means may also be named as a processor configured to perform a design, wherein any type of processor is suitable for performing the design according to the invention. The considerations, optional features and/or optional steps (in the form of corresponding's units or means in the entity) described above (also with reference to the methods), equally apply to the entity depicted in FIG. 5, or to the entities, software program, medium, etc. described below.

Figure 6:
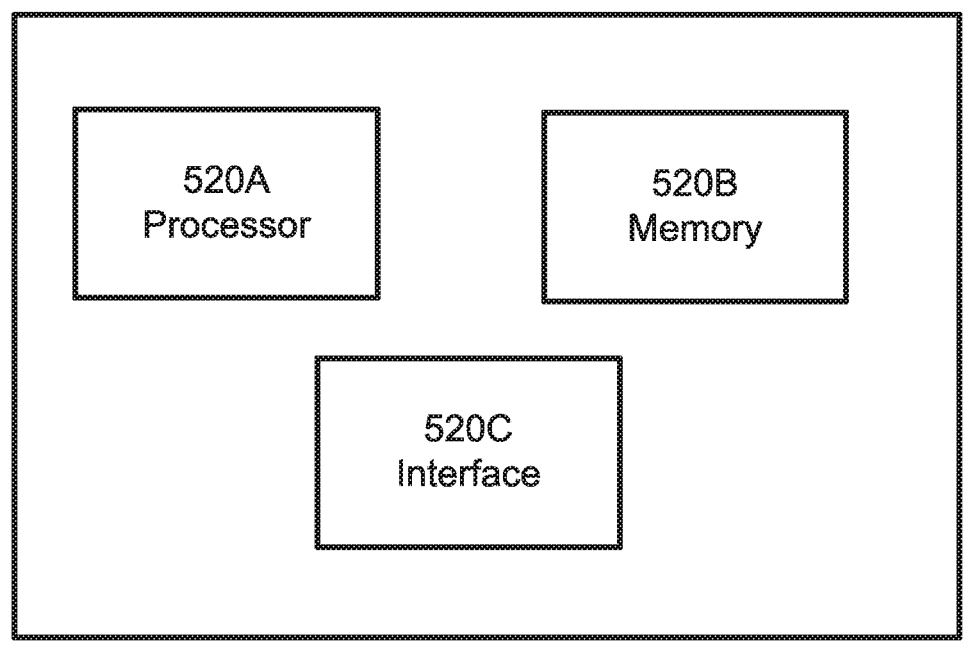
FIG. 6 is a block diagram of a lens design entity according to another embodiment of the invention.

With reference to FIG. 6, an embodiment will be illustrated directed to a lens design entity 520 for designing at least one surface of a lens for a user. The lens design entity 520 comprises acquiring means 520C and designing means 520A. The acquiring means are configured to acquire displacement information on an amount of displacement between a user specific fitting position and a reference fitting position, for which positions the same considerations made above equally apply here. The designing means 520A are configured to design at least one surface of the lens on the basis of the displacement information. FIG. 6 also shows an optional memory 520B, which can comprise the instructions for the software designing the lenses, and, optionally, design characteristic information, and/or design parameters corresponding to the design characteristic information, or in general any information and/or data in relation to the design characteristic information. Also, the designing means 520A may be optionally adapted to obtain a design on the basis of design characteristic information and the displacement information. The acquiring means may also be referred to as a receiver or interface 520C, and the designing means as a processor 520A configured to perform the design.

Figure 7:
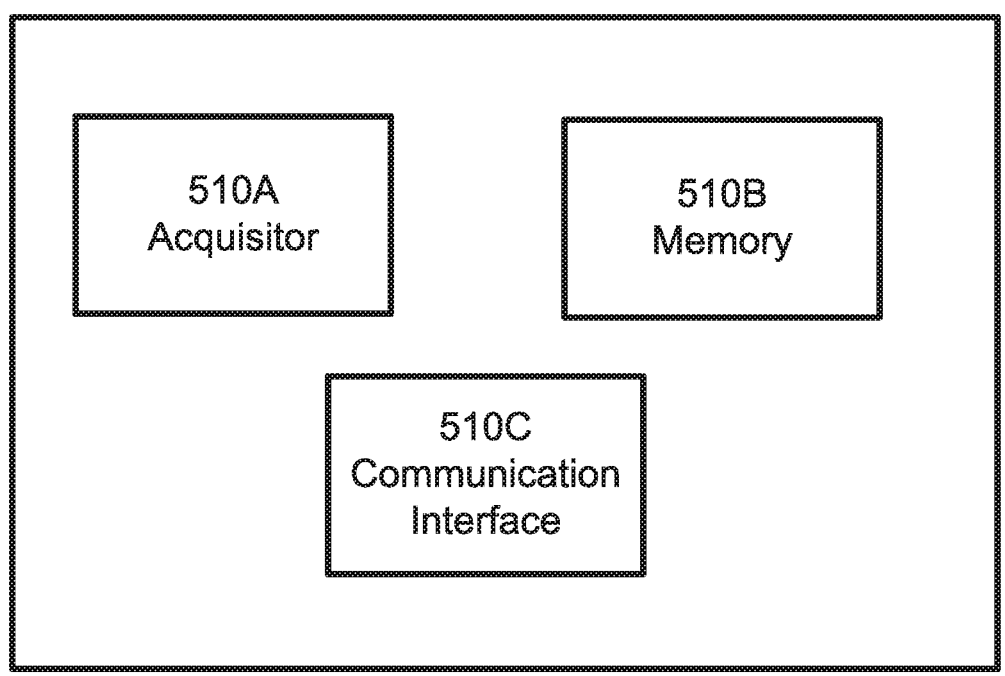
FIG. 7 is a block diagram of a design parameter entity according to an embodiment of the invention.

With reference to FIG. 7, another embodiment will be described for a design parameter obtaining entity 510 for obtaining information necessary for designing at least one surface of a lens for a user. The design parameter obtaining entity 510 includes obtaining means 510A and communication means 510C. The obtaining means 510A are configured to obtain displacement information about an amount of displacement between a user specific fitting position and a reference fitting position as above illustrated. The communication means 510C are configured to communicate the displacement information to another entity configured to design at least one surface of a lens for a user on the basis of a displacement information. The obtaining means 510A can be also named an acquisition unit or acquisitor or acquisition interface 510A for acquiring the displacement information, for instance by means of a graphical interface to an operator who manually inputs such information, or by means of an input/output interface for receiving such information in any electronic way of communication. Further, the communication means 510C can also be named communication interface 510C. FIG. 7 also shows an optional memory, which can optionally be used to store (also temporarily) the acquired information, as well as other information and/or data. It is noted that storing the acquired information is not necessary, since it may be sufficient, once acquired, to communicate them to another entity.

Optionally, the design parameter obtaining entity 510 includes at least one amongst a measuring device adopted to acquire a measurement corresponding to the displacement information, and a computer unit (or computer entity) for acquiring the displacement information. In other words, the displacement information can be directly obtained by a measurement device either as a direct measure about the amount of the displacement, or as indirect indication or indirect measure (for instance calculated from another parameter(s) are directly measured by the device). In another example, the obtaining entity 510 includes a computer to which the displacement information is input, either manually or electronically via an input output interface through which the entity can receive the displacement information electronically from another entity (as also above discussed).

According to another embodiment, a computer program is provided for designing at least one surface of lens for a user, wherein the computer program comprises instructions configured to perform, when the program is executed on a computer, any of the steps of the methods above disclosed. An illustrative computer is depicted in FIG. 17, and later described.

According to a further embodiment (not illustrated), it is provided a medium comprising instructions, which instructions are configured to perform, when they are executed on a computer, any of the steps of any of the methods above described.

It is noted that all considerations made above for the disclosed methods, as well as any optional steps or features of those methods, equally apply to the corresponding devices, and vice versa, such that explanations are omitted for the sake of conciseness.

According to another embodiment, it is provided a lens obtainable by any of the methods above described. In fact, a lens obtainable or directly obtained by any of the previous methods (or entities, software, medium, etc) in which at least one lens surface is designed on the basis of or by taking into account the displacement information, is a lens having improved optical performance when compared to prior art lenses. As it will also be apparent from the following examples, any lens accurately designed by taking into account a displacement information exhibits in fact an improved performance over conventionally designed methods, and are therefore distinguished from prior art lenses in view of their physical construction, in that the lenses of the invention exhibit an improved performance also when the fitting point is displaced.

According to another embodiment, it is provided a lens directly obtained from any of the methods herein described.

According to a further embodiment, it is provided a lens obtainable from any of the methods herein described. In fact, the lens herein described exhibits an improved visual performance than a prior art lens when the fitting point is shifted, since the lens is obtained by taking into account more accurate parameters for describing the frame-eye model.

According to a further embodiment, it is provided a lens (L) having at least one lens surface arranged to be fitted on a spectacle frame in correspondence of a reference position. The reference position represents a primary fitting point (FPi) of the at least one lens surface on a reference line of sight (H) of an eye of the user of the lens. In other words, the lens has a configuration so that it is intended to be fitted according to FPi. The at least one surface is arranged to exhibit predetermined visual optical characteristics relative to a user specific fitting position, wherein the user specific fitting position represents a user specific fitting point (FPm) of the lens surface determined on the basis of the user. In other words, the lens has a surface configuration which exhibits a predetermined visual optical performance (e.g. soft, clear, far vision, etc.) relative to the FPm. In further other words, FPi is the relevant point for the fitting, while FPm is the relevant point for the performance characteristic of the lens. This is in contrast to prior art lenses, wherein one only single point is relevant for both the fitting and the performance characteristics of the lens surface.

Optionally in the lens of the present embodiment, the predetermined visual optical characteristics is one amongst a plurality of visual optical characteristics each relative to said reference position. For instance, the plurality of visual optical characteristics comprise the soft, clear, far vision, etc. characteristics also previously described.

Optionally, in the lens of the present embodiment, the user specific fitting position and said reference position are separated by a displacement amount. The displacement amount can be the one indicated by the displacement information. Thus, above considerations equally apply here.

Optionally, in the lens of the present embodiment, the displacement amount corresponds to displacement information on an amount of displacement between a user specific fitting position and a reference position.

Figure 8:
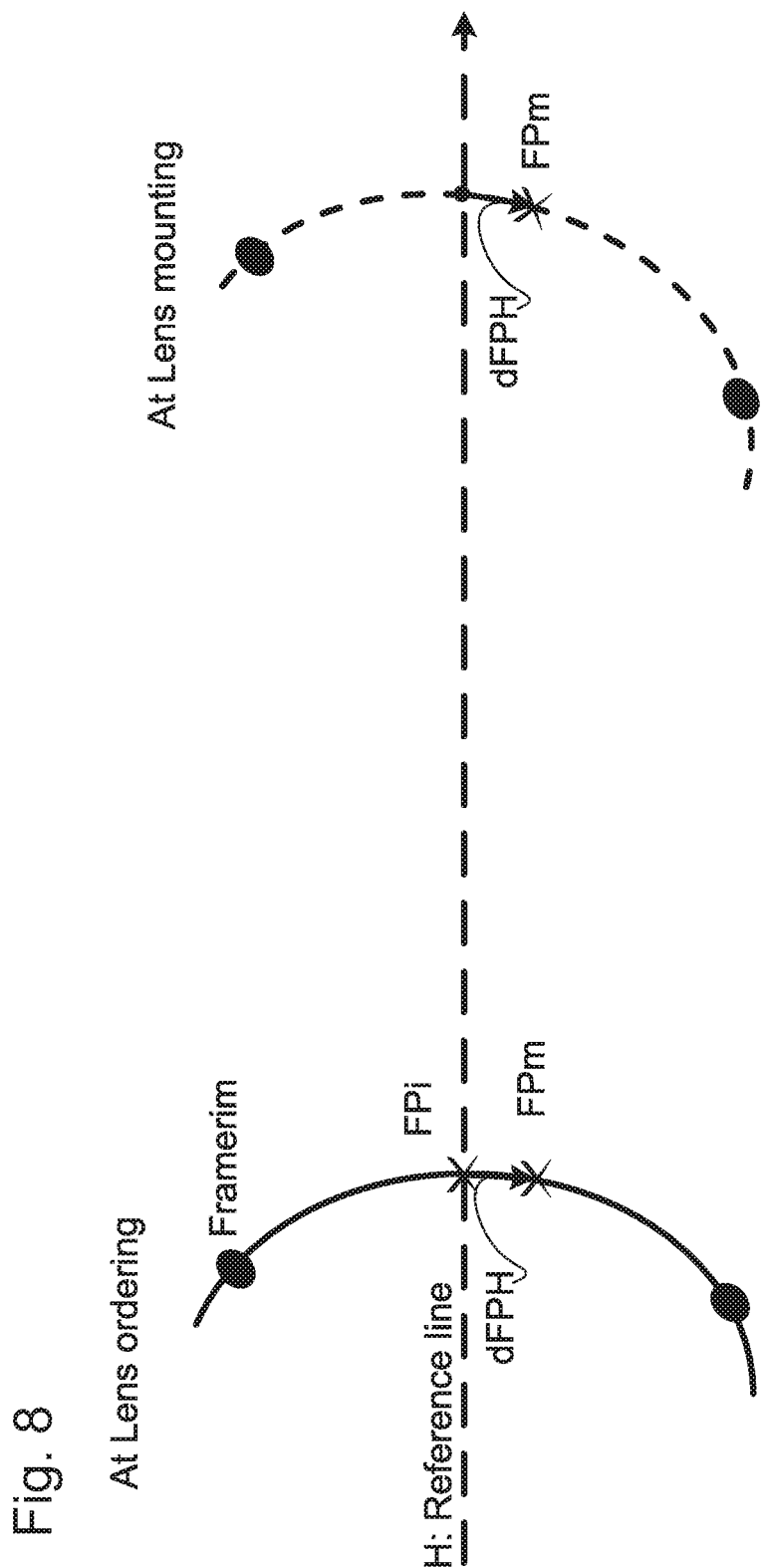
FIG. 8 is a schematic representation showing how the invention is applied when ordering and mounting lenses.

A non-limiting example of how the invention works is now illustrated with reference to FIG. 8. At lens ordering, it is decided to shift the fitting position from a reference fitting position FPi to user specific fitting position FPm (modified fitting position), in the depicted figure being below the point FPi. H represents the reference line of sight, preferably but not necessarily horizontal. In view of this, the displacement information about the amount of displacement dFPH is obtained, and the lens is designed by taking this into account. Therefore, the design takes into account that the distance vision area should not be placed or centred when having FPi as a reference point, but rather by having FPm as a modified reference point. Consequently, the distances between the eye and the lenses when in place in the respective frames are accurately calculated by referring to FPm. When the lens is delivered after production (i.e. after having being machined once the accurate and correct lens surface data is calculated), the lens is mounted, for instance so as to have the FPi point on the reference line of sight. However, since the lens has been designed by taking point FPm as the reference for design, a high visual performance can be obtained, with the same having being adapted for the wearers intended use. In other words, when the optician selects certain design characteristics (see the above examples in relation to soft, clear, far characteristics), the lens design is actually obtained on the basis of such characteristics (typically referring to the reference lens position) and the displacement information.

In general, the displacement information herein discussed may refer also to a displacement amount being equal to 0. However, when a displacement occurs or a measurement error is detected, the displacement information will be different from 0, or the amount of displacement will be different from 0. In any case, the methods and entities may be configured to apply also displacement information corresponding to zero.

An example is further illustrated with reference to FIG. 9. When an optician intends to shift the fitting point from the position of line of sight and the dFPH value is communicated to the lens manufacturer at lens ordering with other individually measured parameters and prescription information, the lens manufacturer can correctly reproduce the positioning of the lenses, frame and user's eyes at the lens design process. If an interface to inform the dFPH value on the lens ordering software is not provided (e.g. by the lens manufacturer), alternative lens ordering method can be used to order individual design lens with correct positioning of lens, frame and eyes as follows. For instance, the FCD' value is calculated from original FCD value and WPA' angle on the software of digital measurement device. At lens ordering, the FCD' values are input in FCD columns and (WPA'+WPA) value is input in WPA column on the lens ordering interface. Also in this case, the lens manufacturer can grasp the correct relative positioning among lenses, frame and eyes.

Another example is further illustrated with reference to FIG. 10. In fact, the invention is not limited to a method based on the linear displacement dFPH, but also extends to variant like for instance a method using the dPRP as a displacement amount, which is the distance between prism reference point from the position of reference (e.g. horizontal) line of sight or ☐HORHT☐ height value of the position of horizontal line of sight from the boxed frame center line or from the bottom line of the boxed frame; also this approach achieves an improved and high visual performance. In addition, the invention in another embodiment can also be exemplified by a method using the dFPA (as an angular displacement), which is the angle between the user's line of sight at the fitting point of lens and line of sight at the position of reference (e.g. horizontal) line of sight; also in this case, improved and high visual performance is obtained. In a further example, a method uses the dPRPA (as an angular displacement), which is the angle between the user's line of sight at the prism reference point of lens and line of sight at the position of horizontal line of sight; also in this case, improved and high visual performance is obtained.

In the following, several non-limiting examples (cases) will be presented to show that applying the present invention achieves a higher visual performance than conventional methods.

Case 1-1: all day use, no displacement In this example, the wearer requires new spectacles having progressive lens for his/her all day use when taking into account of presbyopia (e.g. wearer being sixty years old). When ordering the progressive lens, the optician places an order with the following prescription data and individual parameters:

Lens item individual design/common use PAL, corridor length 11 mm

Prescription R: S+5.00, ADD2.00 with worn ADD, near working distance 40 cm

L: S+5.00, ADD2.00 with worn ADD, near working distance 40 cm

Layout data R: CD 32.0, FPH+4.0
  L: CD 32.0, FPH+4.0
Individual parameters: WPA 8.0, FCD 11.0, FFFA 0.0
  CD: centration distance in mm
  FPH: fitting point height in mm
  WPA: wearer pantoscopic angle (frame base angle)
  FFFA: frame face form angle In this example, conventional design data can be applied since no shift is provided; or, the method of the invention can be applied by inputting a displacement equal to 0, in which case the characteristic of the design needs not be adapted or modified because of the zero displacement. Still, obtaining the (zero) displacement may be contemplated by the embodiments and invention.

The lens manufacturer recommends to mount the PALs to locate each fitting point FP of the left and right PALs at the position found on the reference line of sight of the wearer's eyes. In order to design an individual lens, the manufacturer requires to be informed of parameters relating to the wearing conditions like for instance WPA, FCD, FFFA when having regard of the chosen spectacle frame and when worn by the user, see also the above discussion. FIG. 13 (a) show the astigmatism AS (map on the left) and, respectively, the mean power MP (map on the right) distribution behavior for the user's eye; in this case, the fitting points FP for both lenses are at a location of +4.0 mm (FPH+4.0) from the boxed center line (datum line) of the frame shape. Each fitting point FP of each of the left and right lenses is located just at the user's reference line of sight as recommended by the manufacture. The distribution of AS and MP behaviour for each of the user's eye is good since both PAL lenses are designed in consideration of accurate information on the layout and on accurate individual parameters. Furthermore, the optician mounts the fitting points FP of both PAL lenses so as to be located at the user's primary positions according to recommendation of the lens manufacturer. In other words, the design is made by taking into account the correct distances between the eye and the lenses surfaces, and the physical lens is mounted accordingly. The table provided in FIG. 12 shows the data used for obtaining the AS and MP behaviour maps of FIG. 13(a). The table also shows powers and astigmatism exhibited by the obtained lens, and in comparison to the respective prescription values. As it can be seen, the prescription power effect for the user's eye at the point of the vertex sphere along the line of sight through the distance reference point of the PAL, which is located 4 mm upward from the fitting point FP, has the same value as the ordered prescription power (S=+5.00). Furthermore, the addition power effect for the user's eye when the spectacles are worn, such effect being the power difference between the power on the vertex sphere along the line of sight through the near reference point (14 mm down side from FP) and through the distance reference point of the PAL, has the same value as the ordered ADD value of 2.00 as prescribed. In case 1-1, since the manufacture is informed of the correct worn conditions of the spectacle frame, it is possible to accurately and correctly design the individual PALs providing good AS and MP distribution as well as a correct prescription powers effect for the wearer. In FIGS. 13 to 15, contour lines in AS and MP distribution are indicated in a 0.25D step. Diameters of maps in FIG. 13 and FIG. 14 are 40 mm (40 phi), and in FIG. 15 are 50 mm (50 phi).

Case 1-2: individual design PAL with shifted Fitting points by optician's decision. No communication of displacement information.

This case relates to the situation wherein the optician intends to shift the Fitting points location in consideration of the user's life style, user's request or user's complaints about previous spectacles, etc. However, the optician does not inform the lens manufacturer that the Fitting points of the PALs will be shifted from the position of user's reference (e.g. horizontal) line of sight at mounting the PALs into the spectacle frame. Thus, the manufacturer designs and produces the ordered PALs without the displacement information, i.e. without information that optician will shift the Fitting points of the PALs at mounting them later in his/her shop. The worn condition of the frame at lens designing by the lens manufacturer is not correct, because the shift of Fitting points was not communicated. WPA and FCD after mounting the PALs into the frame will be misunderstood by the lens manufacturer in this case. In this case/example, an optician orders a pair of progressive lenses with same lens ordering data as case 1-1, without informing the lens manufacturer of the displacement information.

Figure 13B:
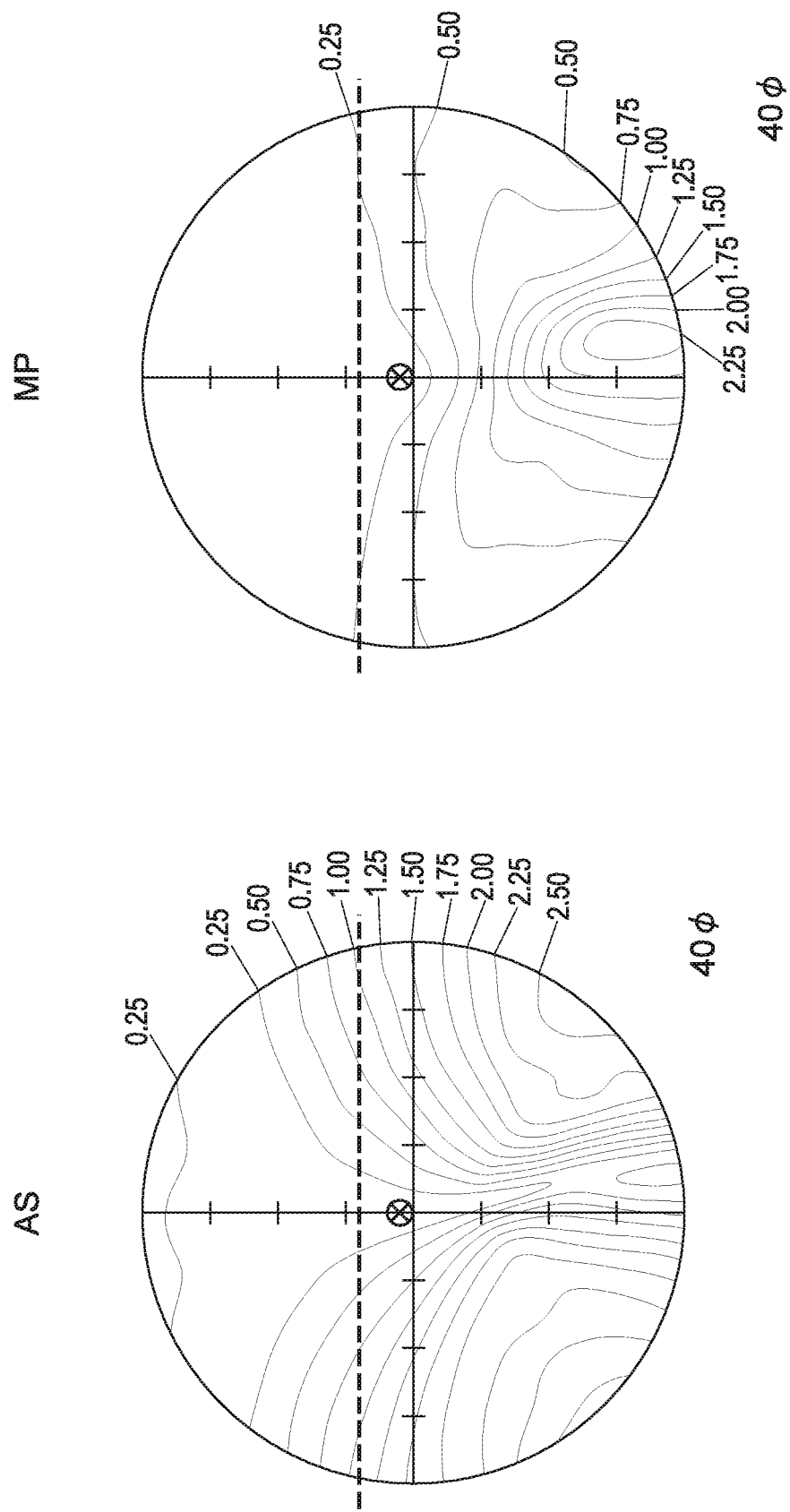

However, the optician shifted the Fitting points location 3 mm lower from the position of user's reference (e.g. horizontal) line of sight at mounting of PALs, because he thought 3 mm lower Fitting points will be suitable for the user who often does long-distance car driving. The optician knows that wider distance vision area can be provided for the user when shifting down Fitting points (i.e. lower FP). The optician doesn't inform the shift of Fitting points location to the lens manufacturer when ordering the lenses. The lens manufacturer designs the ordered PALs with the same condition of case 1-1, i.e. assuming no shift of FP. As a result, the distribution of AS and MP behavior for the user's eye is not good for the wearer. The designed PALs with such condition cannot provide good optical performance such as the distribution of AS and MP of FIG. 13(b). In fact, the distance vision area of right side map of FIG. 13(b) is wider than in FIG. 13(a) according to the optician's intention, but some astigmatism occurs at the center of the near vision area; also, astigmatism at the sides of the near vision area are increased.

Reference is made also to the table of FIG. 12. The prescription power effect for user's eye at the point on the vertex sphere along the line of sight through the distance reference point of the PAL does not have the same value as the ordered prescription power (5+5.00→S+4.98, C−0.09). Further, the addition power effect for user's eye which is the power difference between the power on the vertex sphere along the line of sight through the near reference point and through the distance reference point of the PAL does not have the same value as the ordered ADD value (2.00→2.66 It is too strong). Thus, the spectacles mounting the PALs designed according to sample case 1-2 cannot provide good performance and cannot effectively correct prescription for the user.

Case 1-3: individual design PAL with shifted Fitting points by optician's decision; manufacturer informed of the displacement information.

Figure 1:
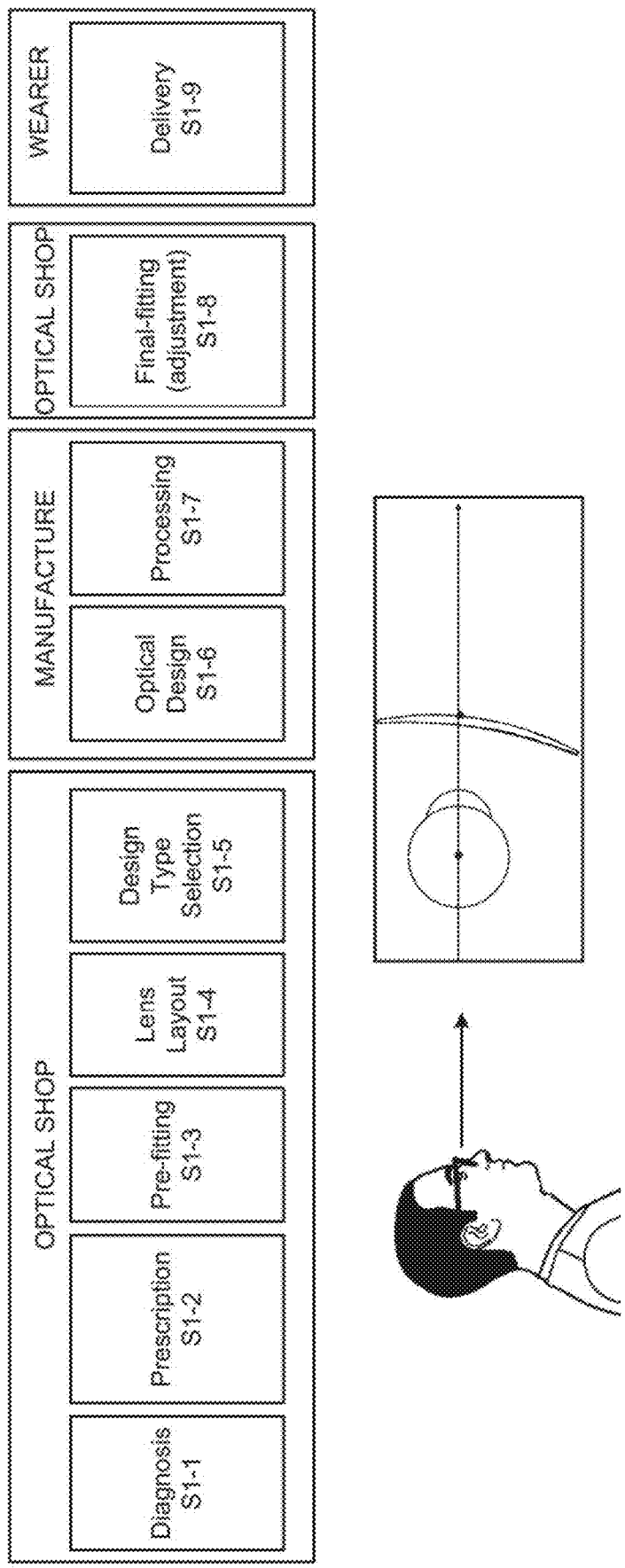
FIG. 1 illustrates an example of conventional steps followed when ordering and delivering lenses tailored for wearers.

As above illustrated, the inventor recognized the need to inform the lens manufacturer of the displacement information, indicating the shift values of Fitting points intended by optician at lens mounting at the shop later. In one example, the lens manufacturer provides the interface on the lens ordering software to inform of the shift of Fitting points, when the optician decides accordingly. In this example, □dFPH□ (delta Fitting Point Height) is the shifted distance from the position of user's horizontal line of sight, and represent an example of the displacement information. □dFPH□ should be determined separately for right eye and left eye as being fitting point heights. □dFPH□ values are not necessarily measured but may be determined by optician's decision according to above mentioned user's information. Preferably, the software for placing the lens order includes a field for inserting and displaying the intended dFPH (e.g. in any of steps S1-3 to S1-5 of FIG. 1, the user interface is adapted to input the dFPH). Once the displacement information like dFPH is input and communicated, the manufacturer can design and produce the ordered PALs with the information that optician will shift the Fitting points of the PALs at mounting them later in the shop. The worn condition of the frame at lens designing by the lens manufacturer is correct because the manufacturer is informed of the shift of Fitting points through the interface of the lens ordering software. WPA and FCD after mounting of PALs into the frame will be understood correctly by the lens manufacture in this case 1-3. In this sample case, user's information, lens item, Prescription and Individual parameters are the same as the case 1-1 but different layout data as follows.

Layout data R: CD 32.0, FPH+1.0, dFPH −3.0
L: CD 32.0, FPH+1.0, dFPH −3.0

An optician orders a pair of progressive lenses with above lens ordering data, with the manufacturer being informed of the dFPH. The optician intends to shift the Fitting points location 3 mm lower from the position of user's reference (e.g. horizontal) line of sight at mounting of PALs, because he/she thought 3 mm lower Fitting points will be suitable for the user who often does long-distance car driving. The optician knows that wider distance vision area can be provided for the user when shifting down Fitting points (i.e. lower FP). The optician informs the shift of Fitting points (dFPH=−3.0:3 mm lower from the position of horizontal line of sight) to lens manufacture at lens ordering. The lens manufacture designs the ordered PALs with the received condition and by taking dFPH into account. Then, the distribution of AS and MP behavior for user's eye is also good for the user like in case 1-1. The designed PALs in consideration to individual worn condition and dFPH data can provide good optical performance such as the distribution of AS and MP, as shown in FIG. 13(c). In particular, the distance vision area as shown in the right side of FIG. 13(c) is wider than in FIG. 13(a) according to the optician intention. Further, astigmatism like in the left side of FIG. 13(b) does not occur at the center of near vision area; in addition, the astigmatism at the sides of the near vision area are not increased, and in fact is at the same good level as in the left side of FIG. 13(a). In other words, the wide area gets wider like in FIG. 13(b), while astigmatism remains good as in FIG. 13(a) and does not get worse as instead in the left side of FIG. 13(b). Reference is also made to the data in the table of FIG. 12. The prescription power effect for user's eye at the point on the vertex sphere along the line of sight through the distance reference point of the PAL which is located 4 mm upside from FP is same value with the ordered prescription powers (S+5.00). And the addition power effect for user's eye (As-worn ADD), which is the power difference between the power on the vertex sphere along the line of sight through the near reference point and through the distance reference point of the PAL, is also the same value as the ordered ADD value (2.00). The spectacles mounted the PALs designed with the condition of sample case 1-3 can also provide good performance and correct prescription effect for the user even in case that optician shifted FP position from the position of user's reference (horizontal) line of sight.

The following cases 1-4 to 1-6 are almost the same as above cases 1-1 to case 1-3, wherein however the prescription power is S−5.00 for right and left eyes. It can be seen that an improved design is obtained also in case of a minus power prescription (S−5.00).

Case 1-4: individual design PAL with the correct worn condition

This user requires new spectacles with progressive lenses for his whole day use, because he has presbyopia. He is 60 years old. An optician orders a pair of progressive lenses with following prescription powers and individual parameters.

Lens item individual design/common use PAL corridor length 11 mm
Prescription R: S−5.00, ADD2.00 with worn ADD near working distance 40 cm
L: S−5.00, ADD2.00 with worn ADD, near working distance 40 cm
Layout data R: CD 32.0, FPH+4.0
L: CD 32.0, FPH+4.0
Individual parameters: WPA 8.0, FCD 11.0, FFFA 0.0

Figure 13D:
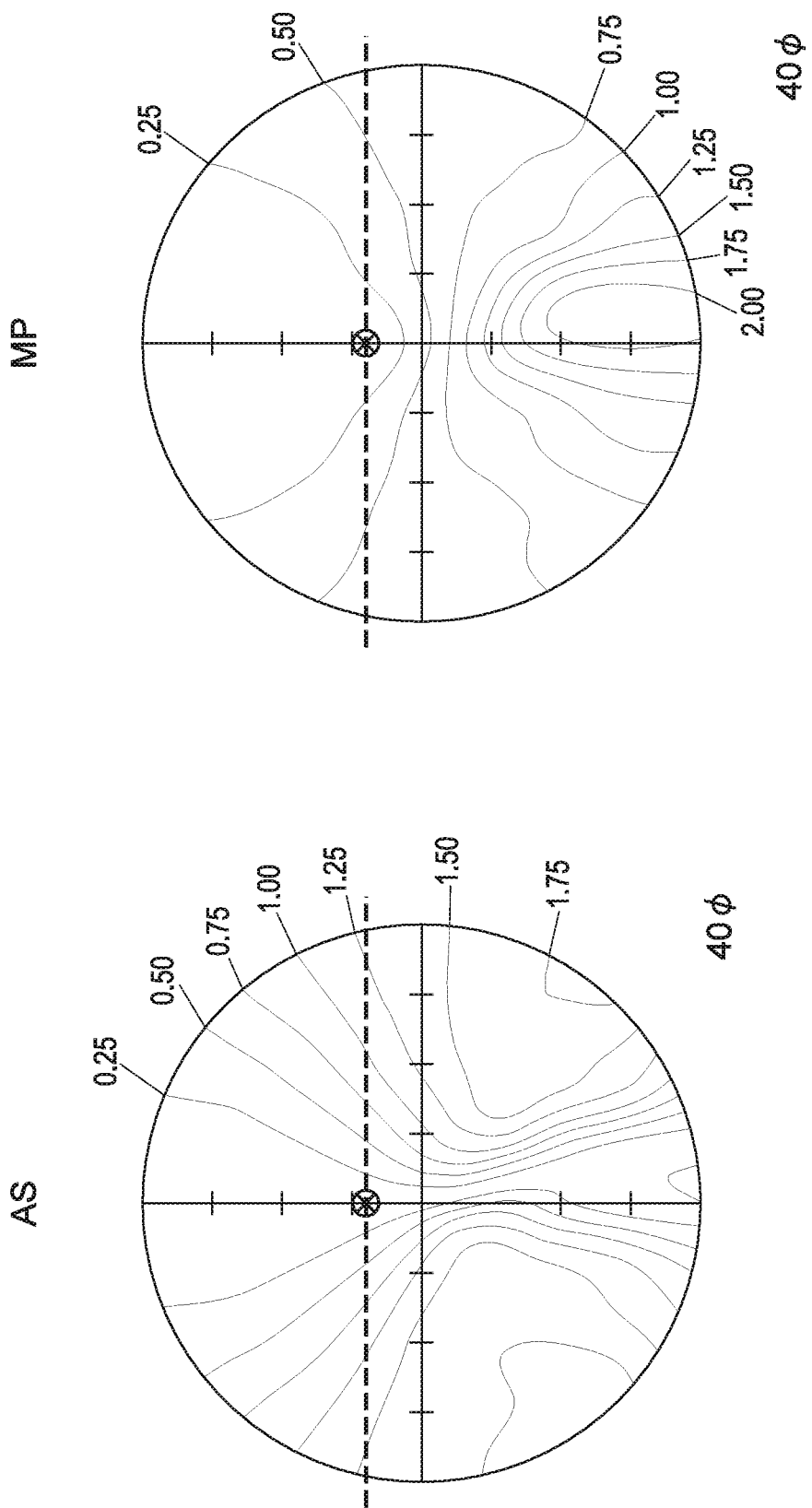

As usual this lens manufacturer recommends to mount the PALs to locate each FP of PALs at the position of reference line of sight, and requires to be informed of the measured individual parameters at lens ordering (e.g. WPA, FCD, FFFA). Left and right side of FIG. 13(d) shows the astigmatism (AS) and, respectively, mean power (MP) distribution for the user's eye for which the spectacles with Fitting points location at +4.0 mm from the boxed center line (datum line) of the spectacle frame and each Fitting points located just at user's reference line of sight are as recommended by the manufacture. The distribution of AS and MP for user's eye is good, because the design has been made on the correct parameters as recommended by the lens manufacture. Reference is made also the FIG. 12, showing a table with the data also for case 1-4. The prescription power effect for user's eye at the point on the vertex sphere along the line of sight through the distance reference point of the PAL which is located 4 mm upside from FP has the same value as the ordered prescription powers (S+5.00). Further, the addition power effect for user's eye (As-worn ADD), which is the power difference between the power on the vertex sphere along the line of sight through the near reference point (14 mm down side from FP) and through the distance reference point of the PAL, has the same value as the ordered ADD value (2.00). In case 1-4, because the lens manufacture grasped correct worn condition of the spectacle frame, the lens manufacture can correctly design individual design PALs which provide good AS & MP distribution and correct prescription power effect for user.

Case 1-5: individual design PAL with shifted Fitting points by optician's decision. Manufacturer not informed of displacement information.

In this case, the manufacturer is not informed of the displacement information since the lens ordering software does not provide such possibility, and therefore design the lens without knowledge of such displacement. As such, the worn condition of the frame used by the manufacturer when designing the lens is not correct. WPA and FCD after mounting of PALs into the frame are misunderstood, or wrongly determined, by the lens manufacture in this case. User's information, lens item, prescription, layout data and individual parameters are all same as the case 1-4. However, the optician shifts the Fitting points location 3 mm below, i.e. the position is 3 mm lower than the position of user's reference line of sight at mounting of the PALs. This is because the optician thought 3 mm lower Fitting points will be suitable for the user who often does long-distance car driving. The optician knows that wider distance vision area can be provided for the user when shifted Fitting points lower. The optician does not inform the manufacturer of the shift of Fitting points location when placing the lens order. The lens manufacture designed ordered PALs with the same condition as for case 1-4, which is recommended condition. In such case, the distribution of AS and MP for user's eye is not good. The designed PALs with such condition cannot provide good optical performance, as it can be seen from the distribution of AS and MP illustrated in the left and, respectively, right part of FIG. 13(e). The astigmatism free area at the distance vision area of FIG. 13(e) is slightly wider than that of FIG. 13(d) according to the optician's intention, but the mean power at the peripheral area of the distance vision area are increased compared to FIG. 13(d) (in other words, the increased mean power is not good to see in the far distance). As such, the lens is not suitable for long driving, because the driver wants to see far distance widely. Reference is also made to FIG. 12 showing data for this case. The prescription power effect for the user's eye at the point on the vertex sphere along the line of sight through the distance reference point of the PAL does not have the same value as the ordered prescription powers (S−5.00→S−4.90, C−0.09). Further, the addition power effect for the user's eye, which is the power difference between the power on the vertex sphere along the line of sight through the near reference point and through the distance reference point of the PAL, does not have the same value as the ordered ADD value (2.00→1.88; it is too weak). The spectacles mounting the PALs designed with the condition of this sample case cannot provide good performance and correct prescription effect to the user.

Case 1-6: individual design PAL with shifted Fitting points by optician's decision, with lens manufacturer informed of the displacement information.

Corresponding considerations as for case 1-3 apply here as to the possibility for the optician to inform the manufacturer of the displacement information for instance via an appropriate user interface of the lens ordering software. The manufacturer can thus design accurate lenses, such that WPA and FCD parameters after mounting of PALs into the frame will be understood correctly by the lens manufacture in this case 1-6 similarly to case 1-3. In this sample case, user's information, Lens item, Prescription and Individual parameters are all same as the case 1-4; however, layout data is different and as follows.

Layout data R: CD 32.0, FPH+1.0, dFPH −3.0
L: CD 32.0, FPH+1.0, dFPH −3.0

Figure 13F:
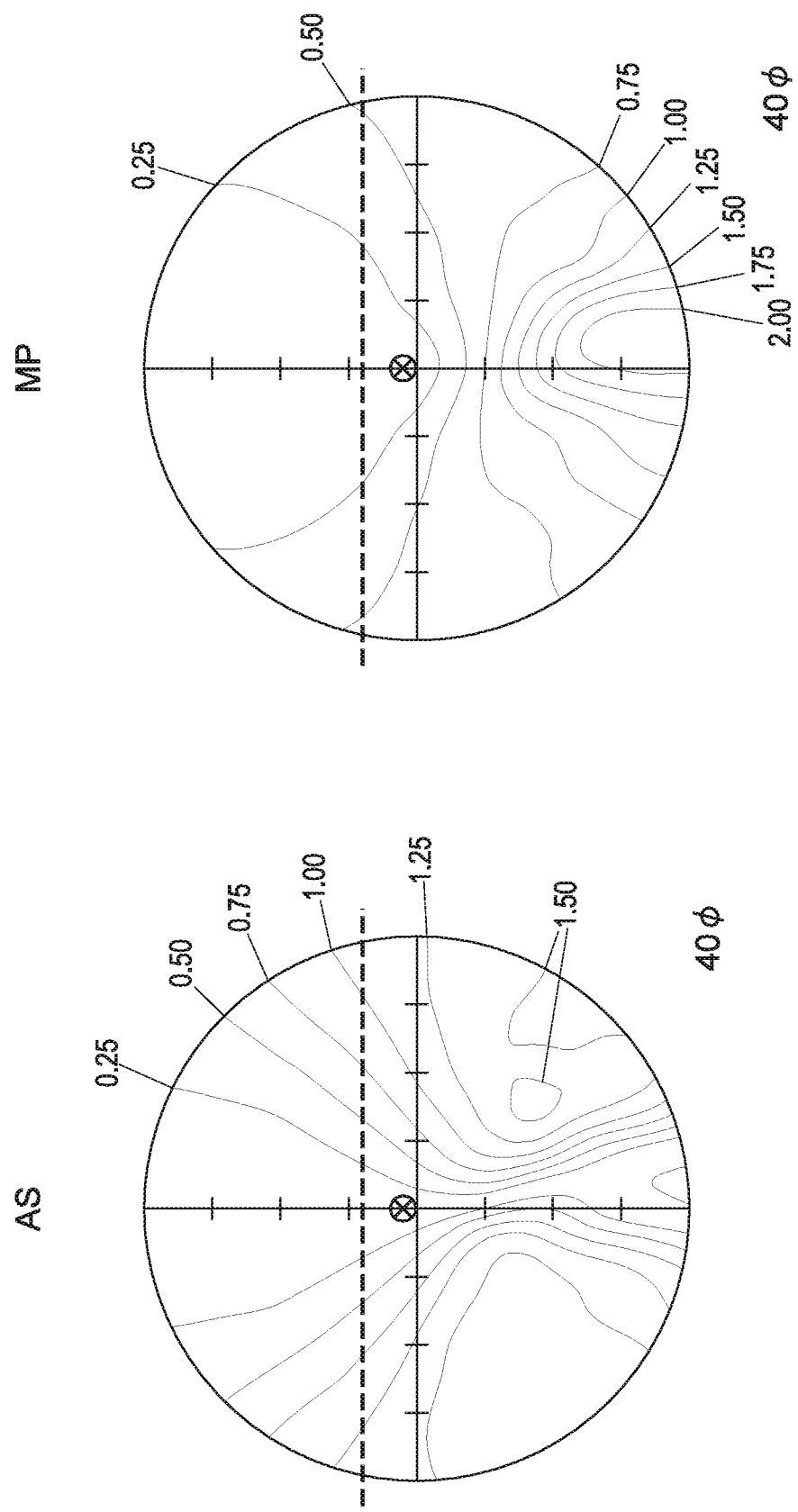

In this example, an optician orders a pair of progressive lenses with above lens ordering data, and informs the manufacturer of the shift of Fitting points (dFPHs). The optician intends to shift the Fitting points location 3 mm lower from the position of the user's reference line of sight at mounting of PALs, because he/she believes that 3 mm lower Fitting points are suitable for the user who often does long-distance car driving, since a wider distance vision area can be provided for the user when shifted Fitting points lower. The optician informs the shift of Fitting points (dFPH=−3.0: 3 mm below the position of user's reference line of sight) to lens manufacture at lens ordering. The lens manufacture designs the ordered PALs by taking into account the dFPH values. Then, the distribution of AS and MP for user's eye for the lenses of case 1-6 is also good for the wearer like in case 1-1 (or 1-4), as it can be seen also in the distribution of AS and MP as from the left part and, respectively, right part of FIG. 13(f). In fact, the distance vision area of FIG. 13(f) is wider than in FIG. 13(d) according to the optician's intention; further, the astigmatism of FIG. 13(e) does not occur, in FIG. 13(f), at the center of the near vision area. Moreover, the astigmatism at the sides of the near vision area are not increased, i.e. they are at the same level as in FIG. 13(d). Reference is also made to FIG. 12 showing data for this case too. Accordingly, the prescription power effect for the user's eye at the point on the vertex sphere along the line of sight through the distance reference point of the PAL, which is located 4 mm upside from FP, has the same value as the ordered prescription powers (S−5.00). Further, the addition power effect for the user's eye (As-worn ADD), which is the power difference between the power on the vertex sphere along the line of sight through the near reference point and through the distance reference point of the PAL, has also the same value as the ordered ADD value (2.00). The spectacles mounting the PALs designed with the condition of sample case 1-6 can also provide good performance and correct prescription effect to the user even in case that optician shifted the FP position from the position of the reference line of sight.

Case 2-1: (indoor design PAL with the correct worn condition)

This user requires to make new spectacles with indoor design progressive lenses for his desk work and PC work, because he has presbyopia. He is 58 years old. An optician orders a pair of indoor design progressive lenses with following prescription powers and individual parameters.

Lens item individual design/indoor design PAL, corridor length 22 mm
Prescription R: S+3.00, ADD2.50 with worn ADD
L: S+3.00, ADD2.50 with worn ADD
Layout data R: CD 32.0, FPH+3.0
L: CD 32.0, FPH+3.0
Individual parameters: WPA 10.0, FCD 12.5, FFFA 0.0

Figure 14A:
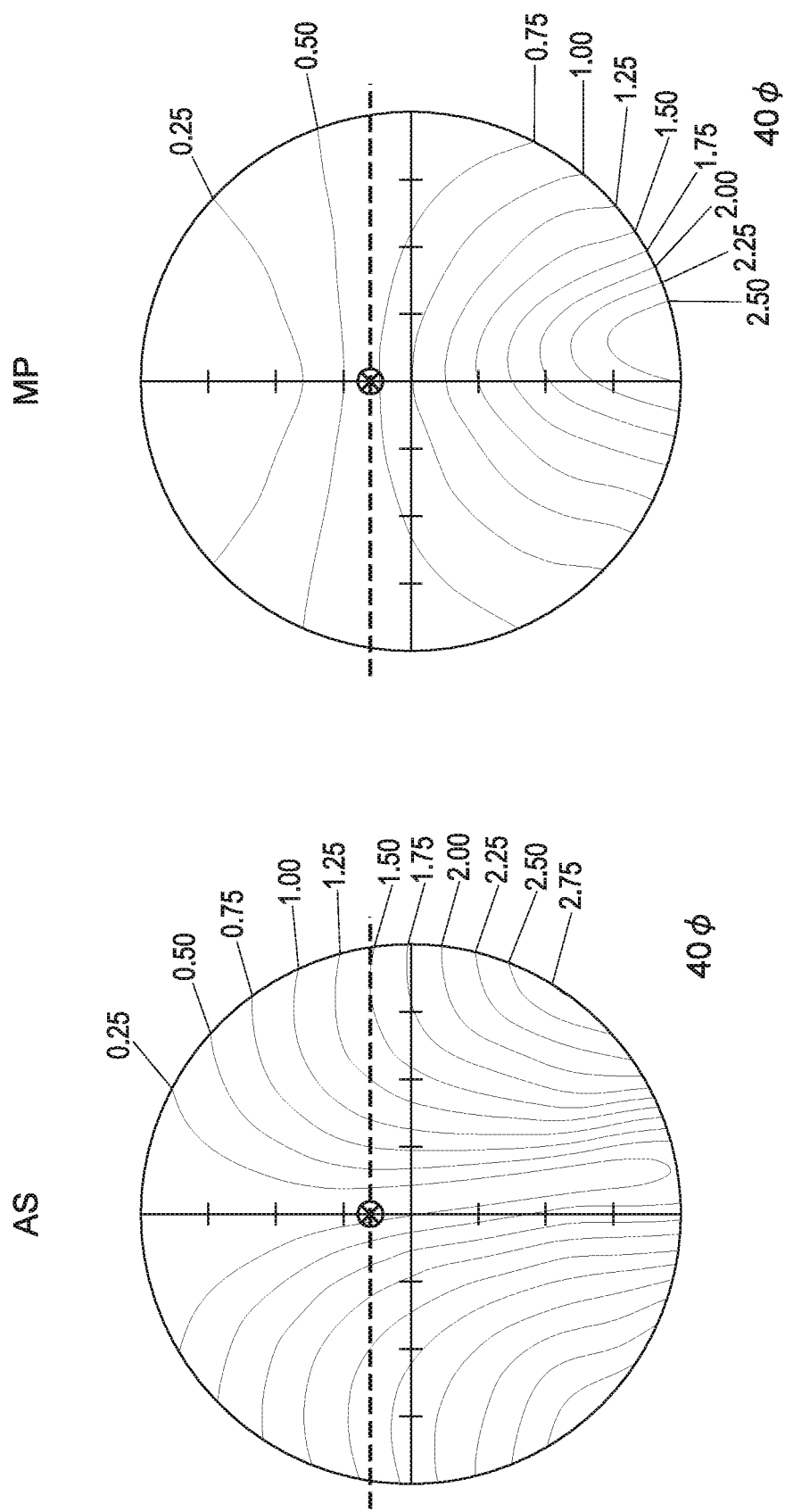

A lens is designed on the basis of the above information. Left and right side of FIG. 14(a) shows the astigmatism (AS) and, respectively, mean power (MP) distribution behavior for the user's eye for which the spectacles with Fitting points location at +3.0 mm from the boxed center line (datum line) of the spectacle frame and each Fitting points located just at user's horizontal line of sight are as recommended by the manufacturer. The distribution of AS and MP for the user's eye is good for user, because these PALs designed in consideration of informed layout data and individual parameters and optician mounted Fitting points of the PALs so as to be located at the positions of user's horizontal line of sights (R/L) according to recommendation by the lens manufacture. Reference is made also to the table of FIG. 12. The prescription power effect for user's eye at the point on the vertex sphere along the line of sight through the distance reference point of the indoor design PALs which is located 13 mm upside from FP are close to the ordered prescription powers (S+3.00→S+2.96, C−0.13). Also, the addition power effect for user's eye which is the power difference between the power on the vertex sphere along the line of sight through the near reference point (17 mm down side from FP) and through the distance reference point of the PAL has the same value as the ordered ADD value (2.50). As for this indoor design PAL, it is given priority of correction of astigmatism and mean power to intermediate distance than far distance. Then, the prescription power effect at the distance reference point is not same as ordered value but close to it. In case 2-1, because the lens manufacture grasped correct worn condition of the spectacle frame, the lens manufacture can correctly design indoor design PALs which provide good AS & MP distribution and correct prescription power effect for user.

Case 2-2 relates to individual design, and in particular to indoor design PAL with shifted Fitting points by optician's decision, wherein the manufacturer is not informed of the displacement (the table of FIG. 12 contains data also referring to this example).

User's information, Lens item, Prescription, Layout data and Individual parameters are all same as the case 2-1. However, the optician shifts the Fitting points location 5 mm higher from the position of user's horizontal line of sight at mounting of PALs, because he/she thought 5 mm higher Fitting points will be suitable for the user who want to use the spectacles for desk work and PC work (Desk top PC). This is because a wider intermediate and near vision area can be provided for the user when the FP position is shifted upward. The optician didn't inform the shift of Fitting points location to lens manufacture at lens ordering, such that the lens manufacturer designed the ordered PALs with the same condition of case 2-1 which is recommended condition. However, the distribution of AS and MP for user's eye is not good for the wearer, as shown in the left and, respectively, right side of FIG. 14(b). In fact, astigmatism is increased at around the FP position and the upper area from FP in comparison to FIG. 14(a) (noting that increased astigmatism is not good for desk work or PC work). As evident also from FIG. 12, the prescription power effect for the user's eye at the point on the vertex sphere along the line of sight through the distance reference point which is located 13 mm upside from FP of the PAL is much deviated from the ordered prescription powers (S+3.00→S+3.28, C−0.41, astigmatism increased). Besides, the addition power effect for the user's eye, which is the power difference between the power on the vertex sphere along the line of sight through the near reference point (17 mm down side from FP) and through the distance reference point of the PAL, does not have the same value as the ordered ADD value (2.50→2.51). The spectacles mounting the PALs designed with the condition of sample case 2-2 cannot provide good performance and correct prescription effect to the user.

Cases 2-3 relates to individual design, in particular to indoor design PAL with shifted Fitting points by optician's decision, wherein the manufacturer is informed of the Fitting points shift.

Figure 14C:
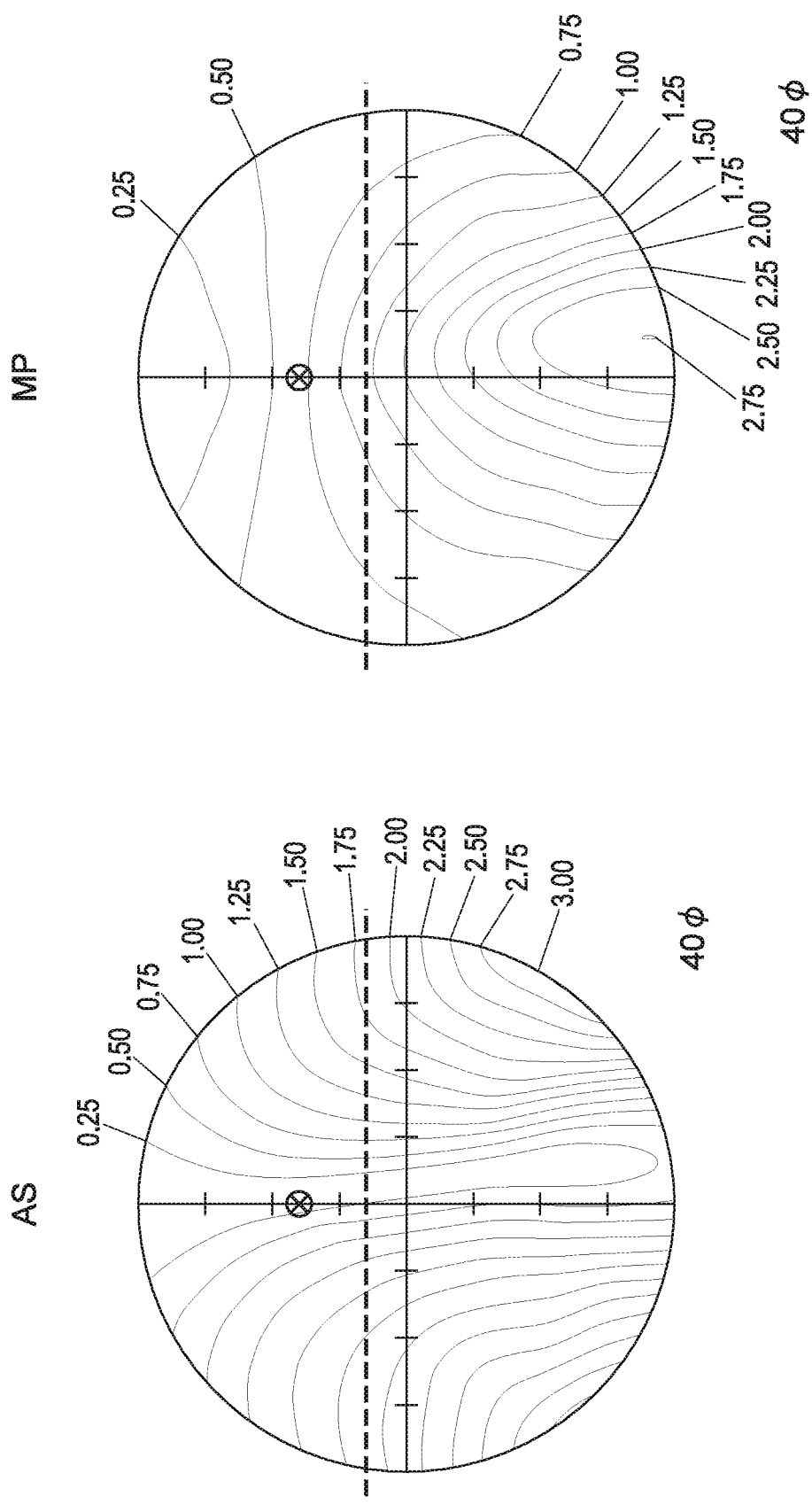
Figure 15B:
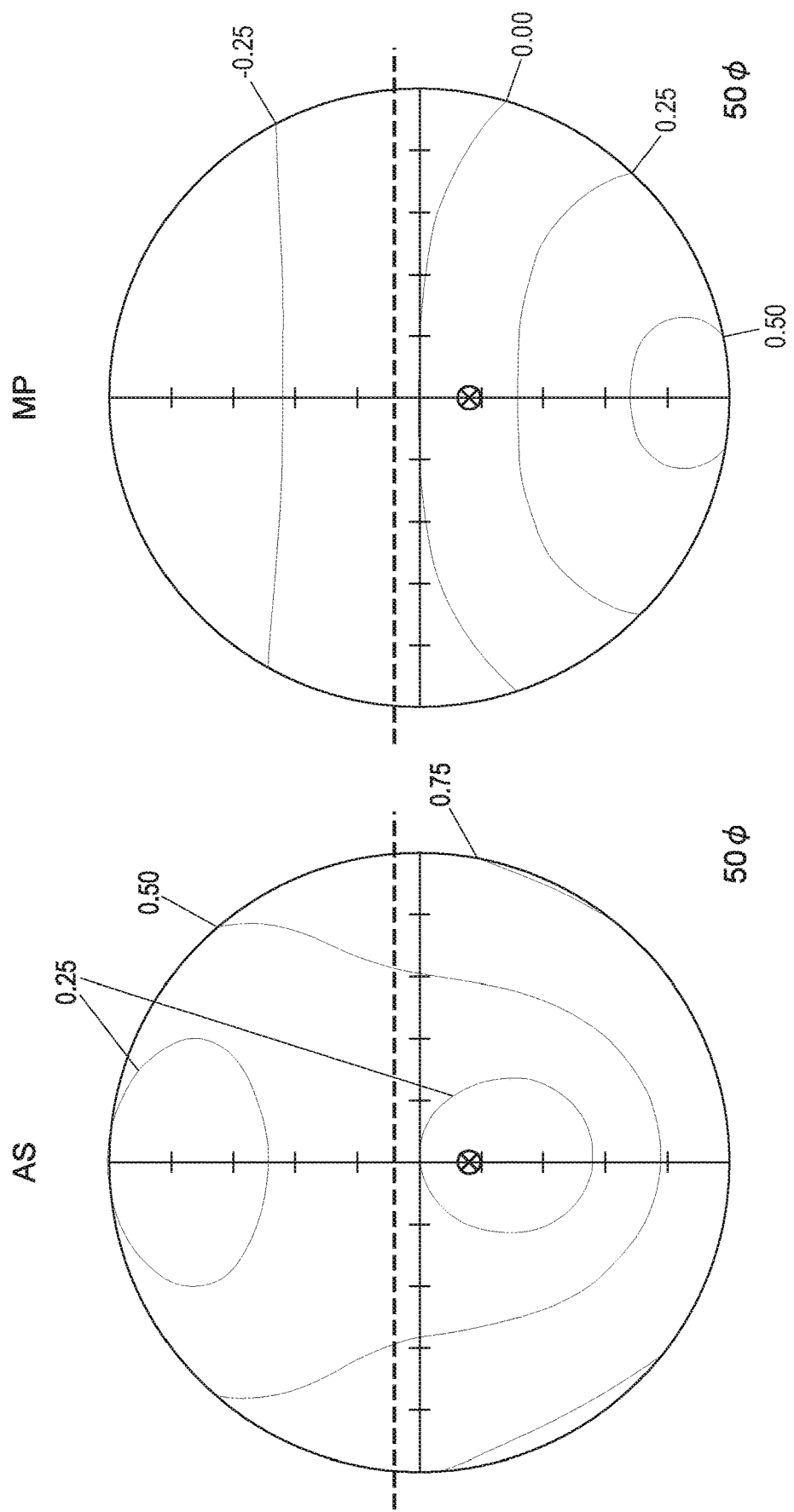
Figure 15F:
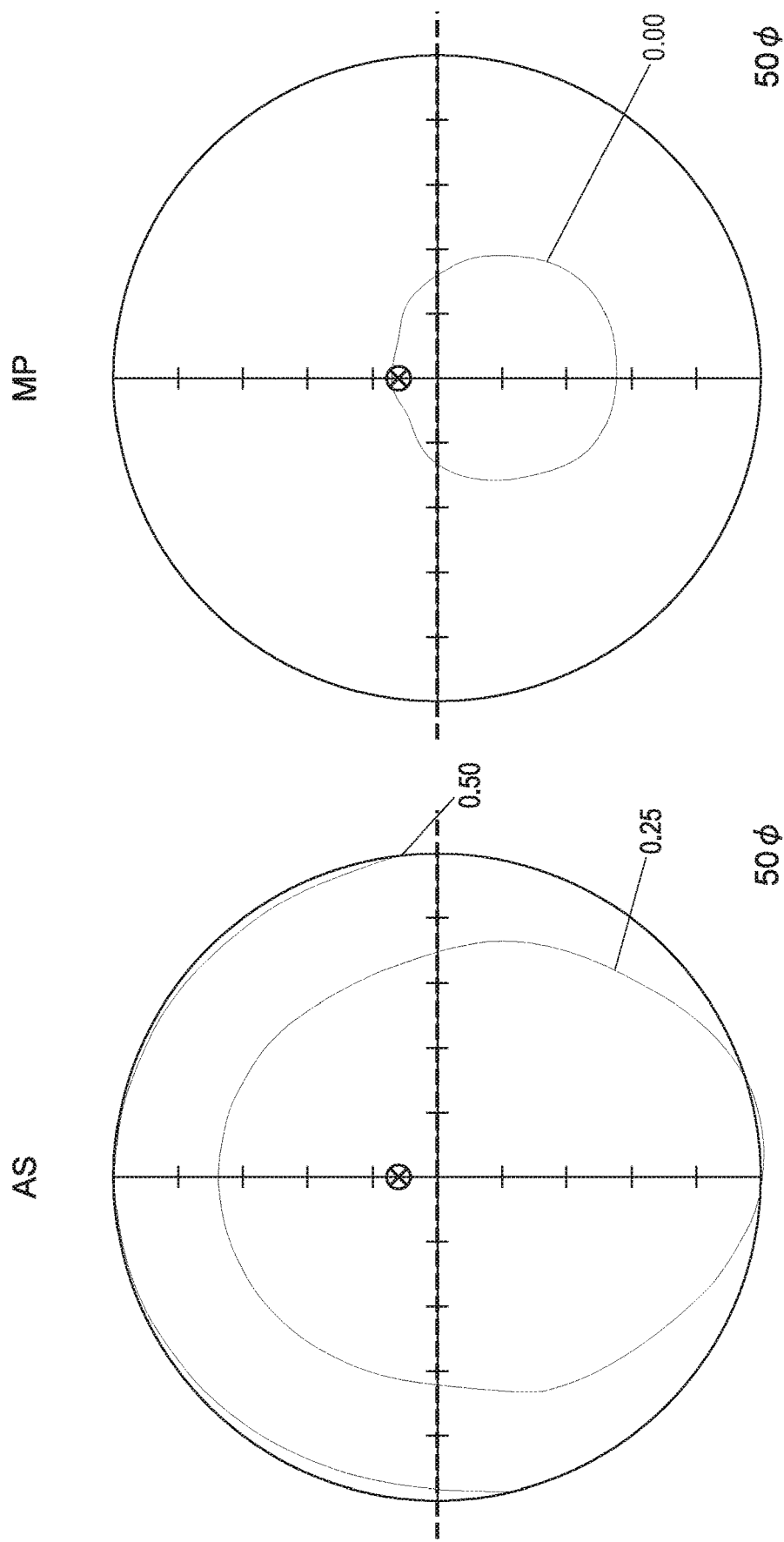

Since the manufacturer is informed of the displacement, the worn condition of the frame at lens designing by the lens manufacturer is correct. Thus, WPA and FCD after the PALs are mounted into the frame will be understood correctly by the lens manufacture. In this case, user's information, lens item, prescription and individual parameters are the same as the case 2-1, but different layout data as follows.
Layout data R: CD 32.0, FPH+8.0, dFPH +5.0
  L: CD 32.0, FPH+8.0, dFPH +5.0
An optician orders the above pair of PAL, and informs the lens manufacture of the shift of Fitting points (dFPHs). The optician intended to shift the Fitting points location 5 mm higher from the position of user's horizontal line of sight at mounting of PALs, because he thought 5 mm higher Fitting points will be suitable for the user who want to use the spectacles for desk work and PC work (Desk top PC). This is because a wider intermediate and near vision area can be provided for the user when the FITTING POINTS are shifted higher. The optician informed the shift of Fitting points (dFPH=+5.0: 5 mm higher from the position of user's horizontal line of sight) to lens manufacturer. For the obtained lens, the distribution of AS and MP for user's eye is also good for user like case 2-1, and as shown in the left and, respectively, right part of FIG. 14(c). More in detail, the mean power distribution around horizontal line of sight of FIG. 14(c) is higher than in FIG. 14(b) according to the optician intention to shift FP higher for desk work and PC work. Also, astigmatism around FP position and upper area from FP is reduced in comparison to FIG. 14(b). With reference to the table of FIG. 12, the prescription power effect for user's eye at the point on the vertex sphere along the line of sight through the distance reference point of the PAL which is located 13 mm upside from FP is close to the ordered prescription powers (S+3.00→S+2.99, C−0.16). Also, the addition power effect for the user's eye (As-worn ADD), which is the power difference between the power on the vertex sphere along the line of sight through the near reference point and through the distance reference point of the PAL, has also the same value with ordered ADD value (2.50).

The spectacles mounted the PALs designed with the condition of sample case 2-3 can also provide good performance and correct prescription effect to the user even in case that optician shifted FP position from the position of user's horizontal line of sight.

Case 3-1: individual design Single Vision (SV) lens with the correct worn condition This user requires new spectacles with single vision lenses as reading glasses, because he has presbyopia. He is 65 years old. An optician orders a pair of individual design single vision lenses with following prescription powers and individual parameters.
Lens item individual design/single vision
Prescription R: S+4.00
  L: S+4.00
Layout data R: CD 32.0, FPH+2.0
  L: CD 32.0, FPH+2.0
Individual parameters: WPA 11.0, FCD 13.0, FFFA 0.0 The obtained lens shows astigmatism (AS) and mean power (MP) as in the left and, respectively, right part of FIG. 15(a) (Fitting points location at +2.0 mm from boxed center line (datum line) of the spectacle frame and each Fitting points located just at user's reference line of sight). The distribution of AS and MP is good for the wearer, because these SV lenses are designed on the basis of correct information. With reference to the table of FIG. 12, the prescription power effect for user's eye at the point on the vertex sphere along the line of sight through the reference point of the individual design SV lenses which is located at FP has the same value as the ordered prescription powers (S+4.00). In case 3-1, because the lens manufacture correctly grasped worn condition of the spectacle frame, the lens manufacture can correctly design individual design single vision lenses which provide good AS and MP distribution and correct prescription power effect for user.

Case 3-2: individual design SV lens with shifted Fitting points by optician's decision. Manufacturer not informed of displacement.

The User's information, Lens item, Prescription, Layout data and Individual parameters are the same as case 3-1. However, the optician shifts the Fitting points location 6 mm lower from the position of user's horizontal line of sight at mounting of the lenses, because he/she thought 6 mm lower Fitting points will be suitable for reading use. In fact, a wide and clear near vision can be provided for the user when the Fitting points are shifted below, i.e. at a lower position for reading use. However, the manufacturer is not informed of the displacement. As a result, the distribution of AS and MP for user's eye is not good, as shown in the left and, respectively, right part of FIG. 14(b). In fact, unwanted astigmatism is widely distributed especially in the peripheral area of the lens. With reference to FIG. 12, the prescription power effect for user's eye is much deviated from the ordered prescription powers (S+4.00→S+3.94, C−0.15, astigmatism occurs). The spectacles mounting the SV lenses designed with the condition of sample case 3-2 cannot provide good performance and correct prescription effect to the user.

Case 3-3: individual design SV lens with shifted Fitting points by optician's decision; manufacturer informed of the shift of Fitting points.

User's information, Lens item, Prescription and Individual parameters are the same as the case 3-1, but layout data are different and as follows.
Layout data R: CD 32.0, FPH −4.0, dFPH −6.0
L: CD 32.0, FPH −4.0, dFPH −6.0
The optician intends to shift the Fitting points location 6 mm lower from the position of user's horizontal line of sight at mounting of the lenses, because he thought 6 mm lower Fitting points will be suitable for reading use. In fact, a wide and clear near vision can be provided for the user when shifting the Fitting points lower for reading use. The lens manufacturer, having being informed of the displacement, designs the lenses accordingly, which show good AS and MP performance conditions as in case 3-1, see also FIG. 14(c) compared to 14(a). Further, the unwanted astigmatism which occurs in case 3-2, is reduced instead in case 3-3. With reference to FIG. 12, the prescription power effect for user's eye has the same value as the ordered prescription powers (S+4.00). The spectacles mounting the SV lenses designed according to case 3-3 can also provide good performance and correct prescription effect to the user, even in case the optician shifts FP position.

Case 3-4: individual design SV with correct worn condition (no shift), and negative correction prescription.

The user of this case requires new spectacles with single vision lenses for driving. He is 35 years old. An optician ordered a pair of individual design single vision lenses with following prescription powers and individual parameters.
Lens item individual design/single vision
Prescription R: S−6.00/L: S−6.00
Layout data R: CD 32.0, FPH 0.0
L: CD 32.0, FPH 0.0
Individual parameters: WPA 6.0, FCD 13.0, FFFA 0.0 With reference to FIG. 14(d), it is shown that AS and MP distribution for the user's eye, for which the spectacles are with Fitting points location at 0.0 mm just on the boxed center line (datum line) of the spectacle frame and each Fitting points is located just at user's reference line of sight, are as recommended by the manufacture. The distribution of AS and MP act for user's eye are good, see FIG. 14(d). With reference to FIG. 12: the prescription power effect for user's eye at the point on the vertex sphere along the line of sight through the reference point of the SV lenses which is located at FP have the same value as the ordered prescription powers (S−6.00). In case 3-4, because the lens manufacture correctly grasped the worn condition of the spectacle frame, the lens manufacture can correctly design individual design single vision lenses which provide good AS and MP distribution and correct prescription power effect for user.

Case 3-5: individual design SV lens with shifted Fitting points by optician's decision. Manufacturer not informed of shift.

User's information, Lens item, Prescription, Layout data and Individual parameters are all same as the case 3-4. However, the optician shifts the Fitting points location 3 mm higher from the position of user's reference line of sight when mounting the lenses, because he thought 3 mm higher Fitting points will be suitable for driving use. Wide and clear distance vision can be provided for the user when shifting the Fitting points higher for driving use. In this case, the manufacturer designs the lenses without having knowledge of the displacement. As a result, the distribution of AS and MP act for user's eye is not good for user, as shown in FIG. 14(e). In fact, unwanted astigmatism occurs around the upper area of the lens. With reference to FIG. 12, the prescription power effect is much deviated from the ordered prescription powers (S−6.00→S−6.03, C−0.12, astigmatism occurred). The spectacles mounted the SV lenses designed with the condition of sample case 3-5 cannot provide good performance and correct prescription effect to the user.

Case 3-6: individual design, SV lens with shifted Fitting points by optician's decision, manufacturer informed of displacement.

User's information, Lens item, Prescription and Individual parameters are all same as the case 3-4, but layout data are different and as follows.
Layout data R: CD 32.0, FPH+3.0, dFPH +3.0
L: CD 32.0, FPH+3.0, dFPH +3.0
The optician intends to shift the Fitting points location 3 mm higher from the position of user's horizontal line of sight at mounting of the lenses, because he thought 3 mm higher Fitting points will be suitable for driving use. The manufacturer is informed of the shift and designs the lenses accordingly. As a result, the distribution of AS and MP for user's eye is good as in case 3-1 or 3-4, see also FIG. 14(f). In particular, the unwanted astigmatism that occurs in case 3-5, is reduced in case 3-6. With reference to FIG. 12, the prescription power effect for the user's eye has the same value as the ordered prescription powers (S−6.00). The spectacles mounted the SV lenses designed with the condition of sample case 3-6 can also provide good performance and correct prescription effect to the user even in case that optician shifted FP position from the position of the reference line of sight.

FIGS. 11a, 11b, and 11c show how the shift amount can be obtained. As shown in FIG. 11(a), a digital measurement device takes a digital photo in the horizontal direction. Then, the position of the pupil images can be recognized as the position of the user's reference (in the example, horizontal) line of sight. Opticians usually determine the position of the fitting point of spectacle lenses at the position of user's horizontal line of sight according to the maker's recommendation. Then, the marks of fitting point (for example+in FIG. 11 (b)) will be positioned at the right/left position of the user's horizontal line of sight by opticians on the display. The measurement device will recognize the height of the fitting points from boxed center line (datum line) or from the bottom line of the frame box. The recognized fitting point heights will be used when ordering the lens. If opticians intend to shift the fitting point from the position of the user's reference line of sight, the position of shifted fitting points should be checked and confirmed on the display of the measurement device, see FIG. 11(c). The position of the fitting point on the display should be moved according to the dFPH value input by optician. Changed fitting point heights and/or dFPH values are thus used when ordering the lens(es).

Astigmatism and mean power distribution of FIGS. 13 to 15 are described based on the power defined on the vertex sphere in each direction of the line of sight with the coordinates on the front surface of the lens. Further, the mean power illustrated in FIGS. 13 to 15 is the deviation of the mean power (spherical power−Astigmatism/2) at each line of sight on the vertex sphere from the ordered prescription power. Thus, it can be seen that the power varies from the far distant region to the near region (for PALs) progressively according to the required addition. Further, the prescription power effect for user's eye at each point on the vertex sphere along the line of sight through the distance reference point and the near reference point are defined on the vertex sphere surface as in FIG. 16. The vertex sphere 1610 is the sphere surface centered around the center point of eye rotation 0; it touches or crosses the lens back surface at the intersection point of the lens back surface and reference (e.g. horizontal) line of sight H of eye. The figure illustrates different rays 1630a, 1630b passing on a line of sight of the eye. A focimeter 1620 is illustrated. The power defined on the vertex sphere in each direction of line of sight can be considered as the prescription power effect for the eye.

FIG. 17 is a block diagram showing a computer suitable for being used for the present invention. The computer 1700 includes a processor 1720, a memory 1730, and an interface 1710. The processor 1720 is configured to execute instructions (e.g. for implementing one or more of the steps above described). The memory can be configured to store the necessary instructions or necessary data. The interface 1720 can be configured to obtain data from other computers and/or from a computer user, or to communicate information to other entities and/or to a computer user. The different units can communicate via a common bus and/or via direct connections.

How the invention can operate is further explained with reference to illustrative and non-limiting FIG. 18. In step S1810, order information is obtained. The order information comprises prescription information (one or more of Sphere, Add, Cyl, Axis, Prism) and individual parameters. The individual parameters may comprise one or more of FCD, WPA, CVD, PA, FFFA, etc. Also, the order information may comprise displacement information, in one example dFPH. The individual parameters may be manually or automatically measured, as above explained. Similarly, the displacement information may be set manually or automatically. In step S1820, it is checked whether displacement information is provided. In case no displacement is provided (branch N at step S1820), then a design step S1830 is performed, without taking into account any shift of the Fitting points, since at lens ordering there was no intention to shift the FP. In design step S1830, the individual parameters as obtained at S1810 can be directly used. The result of design step S1830 can lead to lenses as in cases 1-1, 1-4, 2-1, 3-1, 3-4. In case displacement information is provided (branch Y at step S1820), a step S1825 is performed for transforming or correcting one or more of the individual parameters obtained at step S1810. For instance, step S1825 may calculate the correct FCD' parameter on the basis of the measured FCD parameters (as obtained at S1810). Even if more individual parameters are obtained, it may be sufficient to correct only one of them, or a subset of the obtained ones. For the correction, the displacement information is used as above illustrated. Then, at S1840, the lens is designed on the basis of the one or more corrected individual parameters. Such design can result in lenses as in cases 1-3, 1-6, 2-3, 3-3 or 3-6. In the prior art, the method and ordering system are not arranged to obtain the displacement, see branch 1890. In such a case, a design step S1860 is performed, wherein always the measured individual parameters are used, also when a shift has been decided by the optician. In particular, when a shift is adopted, the design will be carried out by using the wrong individual parameters. Such design will thus lead to a low quality visual performance, see cases 1-2, 1-5, 2-2, 3-2, 3-5. In case the ordering system is capable of including the displacement into the order, but the lens design system is not configured to understand its meaning (see branch N* in FIG. 18), still the convention design S1860 is performed, leading to low quality performance when a shift has been adopted. It is noted that step S1830 can be as a conventional S1860 design step. However, the methods, entities, system, etc. of the invention are arranged such that such conventional system is used only when the displacement is zero. Further, step S1840 can be a conventional design step as S1860. However, the methods, entities, system, etc. of the invention are arranged to input corrected parameters, such that the design can produce high performance lenses. Alternatively, step S1820 and S1830 can be combined, e.g. a design step S1830' can be obtained capable of working directly on the basis of the obtained order information. Further, step S1820 may be combined with step S1810, to have a modified step S1810' in which the parameters are corrected (in case of zero displacement, no correction is necessary, or the corrected parameter is made equal to the measured value); the parameters from such step S1810' can then be directly given to a design step like S1830. Also, the flow chart of FIG. 18 can be implemented in one entity or in multiple entities, as also above explained.

The invention is applicable also when no individual parameter is sent. For instance, semi-individual lenses want to produced, wherein a series of lenses are designed for a certain range of FCD (or other individual parameter) values. In such case, it is not necessary to communicate any individual parameter, or at least a restricted number thereof.

It will be apparent to those skilled in the art that various modifications and variations can be made in the entities, methods, systems, computer programs, medium and signals (carrying instructions for executing the program) of the invention as well as in the construction of this invention without departing from the scope or spirit of the invention. The invention has been described in relation to particular embodiments and examples which are intended in all aspects to be illustrative rather than restrictive. Those skilled in the art will appreciate that many different combinations of hardware, software and firmware will be suitable for practicing the present invention, which scope and spirit is defined by the following claims.

The invention claimed is:

1. A method for designing, by means of a computer, at least one surface of a lens for a user, the method comprising steps of:
   (i) obtaining a parameter of the user at a reference fitting position where a reference fitting point of the lens is located on a reference line of sight of an eye of the user, the reference line of sight being substantially horizontal;
   (ii) determining a user specific fitting position where a user specific fitting point is located, the user specific fitting position being vertically shifted from the reference fitting position at least partly on the basis of an expected usage of the lens by the user, in which the user specific fitting position is located at a position vertically shifted from the position of the reference fitting point of the lens in the reference fitting position;
   (iii) obtaining displacement information on an amount of vertical displacement between a height of the user specific fitting position and a height of the reference fitting position; and
   (iv) designing the at least one surface of the lens at least partly on the basis of prescription information and on the basis of a modified parameter of the user which is calculated from the parameter of the user based on the amount of the vertical displacement, wherein
the parameter of the user includes a relative placement between the lens and a face of the user, or between a frame and the eye.

2. The method according to claim 1, wherein said designing of said at least one surface of the lens further comprises calculating a design of said at least one surface at least partly on the basis of design characteristic information representing information corresponding to a design having predetermined characteristics relative to said reference fitting position.

3. The method according to claim 1, further comprising a step of obtaining a physical lens including at least one surface corresponding to the designed at least one surface, and fitting the physical lens at a position corresponding to the reference fitting position.

4. The method according to claim 1, further comprising a step of sending said displacement information from a displacement obtaining device to a lens surface design device, wherein said designing of the at least one surface of the lens comprises causing said lens surface design device to design said at least one surface at least partly on the basis of said displacement information.

5. A non-transitory computer readable medium storing thereon a computer program for designing at least one surface of a lens for a user, the computer program comprising instructions configured to execute, when the computer program is executed on a computer, all of the steps of claim 1.

6. A lens designed according to the method of claim 1.

7. The method according to claim 1, wherein the designing of the at least one surface is further on the basis of at least one of a Frame Corneal Distance (FCD), a Wearers Pantoscopic Angle (WPA), and a Cornea Vertex Distance (CVD).

8. The method according to claim 2, wherein the design characteristic information comprises one of a clear design, a soft design, and a far vision design.

* * * * *